United States Patent
Morton et al.

(10) Patent No.: US 11,412,133 B1
(45) Date of Patent: Aug. 9, 2022

(54) AUTONOMOUSLY MOTILE DEVICE WITH COMPUTER VISION

(71) Applicant: Amazon Technologies, Inc., Seattle, WA (US)

(72) Inventors: Tarun Yohann Morton, San Jose, CA (US); Cheng-Hao Kuo, Kirkland, WA (US); Jim Oommen Thomas, Kenmore, WA (US); Ning Zhou, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/913,498

(22) Filed: Jun. 26, 2020

(51) Int. Cl.
| | |
|---|---|
| *H04N 5/232* | (2006.01) |
| *B25J 19/02* | (2006.01) |
| *B25J 9/16* | (2006.01) |
| *G05D 1/00* | (2006.01) |
| *H04N 5/262* | (2006.01) |
| *G05D 1/02* | (2020.01) |
| *G06T 7/246* | (2017.01) |

(52) U.S. Cl.
CPC ........ *H04N 5/23219* (2013.01); *B25J 9/1697* (2013.01); *B25J 19/023* (2013.01); *G05D 1/0088* (2013.01); *G05D 1/0094* (2013.01); *G05D 1/0231* (2013.01); *G06T 7/251* (2017.01); *H04N 5/23299* (2018.08); *H04N 5/2628* (2013.01)

(58) Field of Classification Search
CPC ......... H04N 21/23418; H04N 5/23219; H04N 5/23299; H04N 5/2628; G01S 13/04; G01S 15/04; G01S 15/06; G01S 17/89; G01S 7/4802; G01S 7/539; G01S 15/42; G01S 17/04; G06K 9/00624; G06K 9/00362; G06T 7/251; G05D 1/0088; G05D 1/0231; G05D 1/0094; B25J 9/1697; B25J 19/023
See application file for complete search history.

(56) References Cited

U.S. PATENT DOCUMENTS

| | | | |
|---|---|---|---|
| 9,876,993 B2* | 1/2018 | Sablak | H04N 7/183 |
| 10,121,494 B1* | 11/2018 | Sundaram | G10L 15/02 |
| 10,427,306 B1* | 10/2019 | Quinlan | B25J 11/008 |
| 10,471,611 B2* | 11/2019 | Dooley | H04N 5/23206 |
| 10,803,667 B1* | 10/2020 | Madden | G06T 19/006 |
| 10,955,860 B2* | 3/2021 | Russell | G08G 5/04 |
| 2002/0044691 A1* | 4/2002 | Matsugu | G06K 9/20 382/218 |
| 2012/0134579 A1* | 5/2012 | Kameyama | G06T 3/4053 382/159 |
| 2015/0125032 A1* | 5/2015 | Yamanaka | G06K 9/00624 382/103 |
| 2015/0253428 A1* | 9/2015 | Holz | G01S 17/36 356/5.01 |

(Continued)

*Primary Examiner* — Paulos M Natnael
(74) *Attorney, Agent, or Firm* — Pierce Atwood LLP

(57) ABSTRACT

A device capable of autonomous motion may process image data determined by one or more cameras to determine one or more properties of objects represented in the image data. The device may determine that two or more computer vision components correspond to a particular property. A first computer vision component may process the image data to determine first output data, and the second computer vision component may process the first output data to determine second output data corresponding to the property.

18 Claims, 27 Drawing Sheets

(56) References Cited

U.S. PATENT DOCUMENTS

| | | | |
|---|---|---|---|
| 2016/0004909 A1* | 1/2016 | Mei | G06K 9/3241 |
| | | | 382/103 |
| 2019/0291277 A1* | 9/2019 | Oleynik | B25J 9/1669 |
| 2021/0193116 A1* | 6/2021 | Geramifard | G10L 15/01 |

* cited by examiner

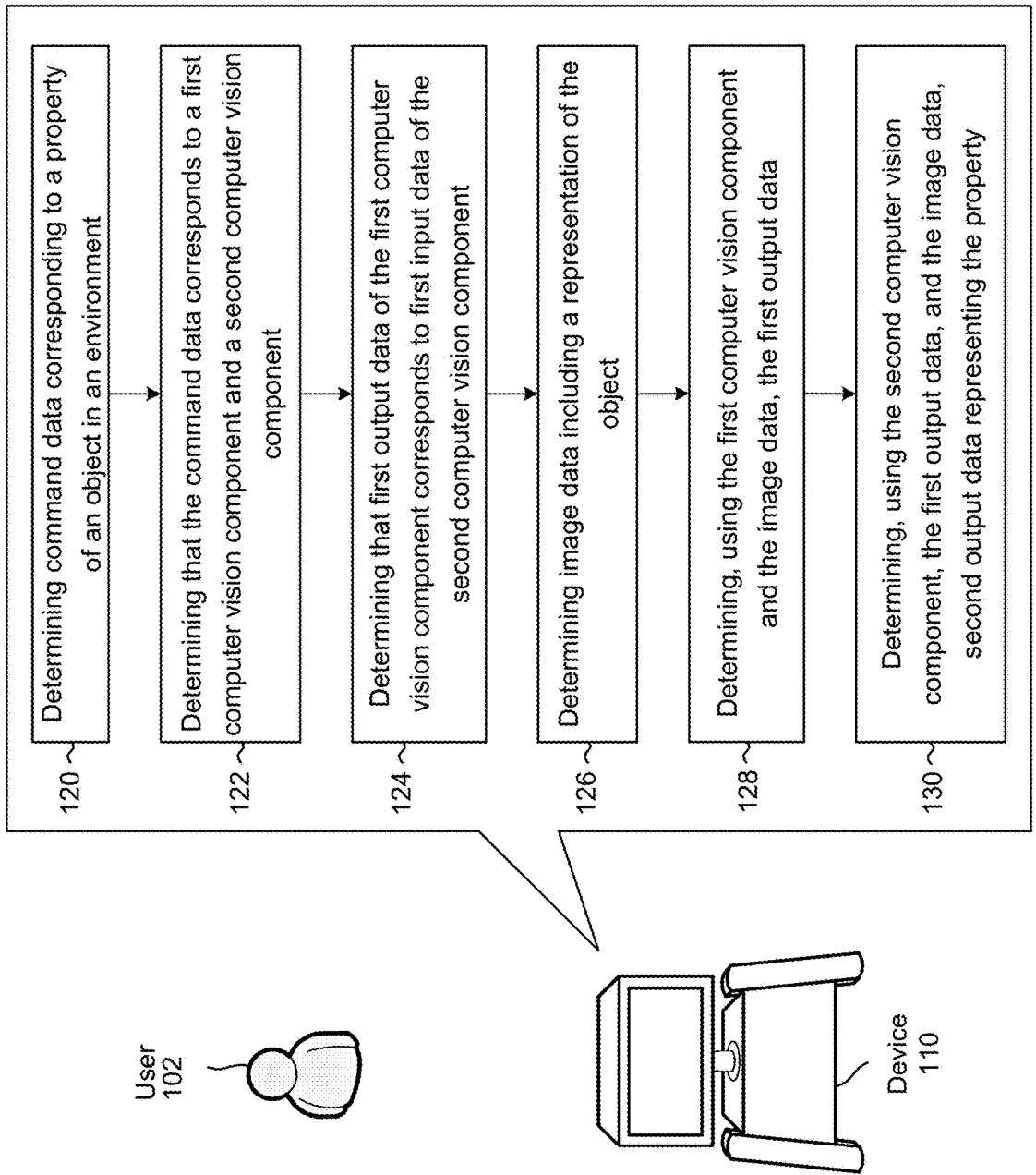

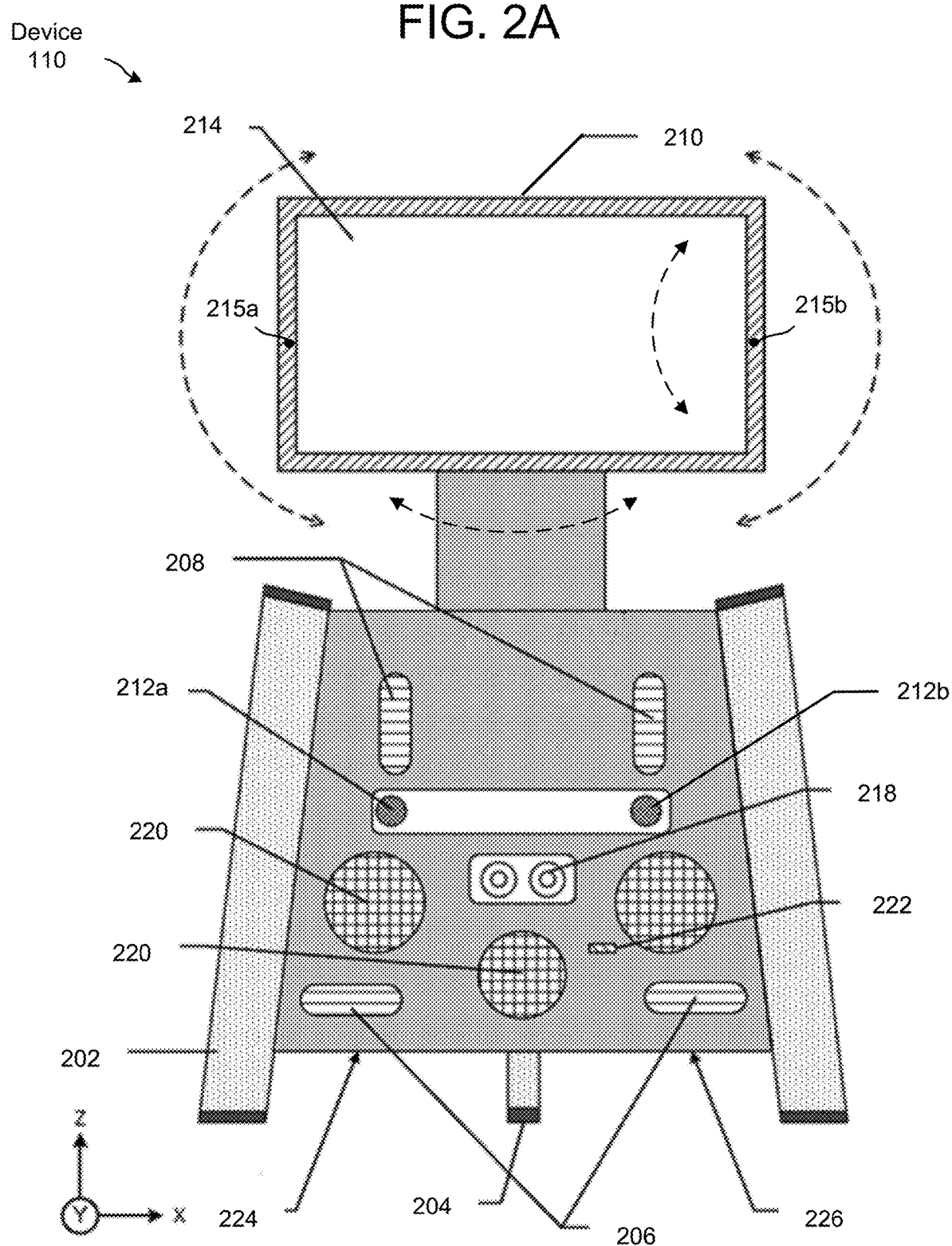

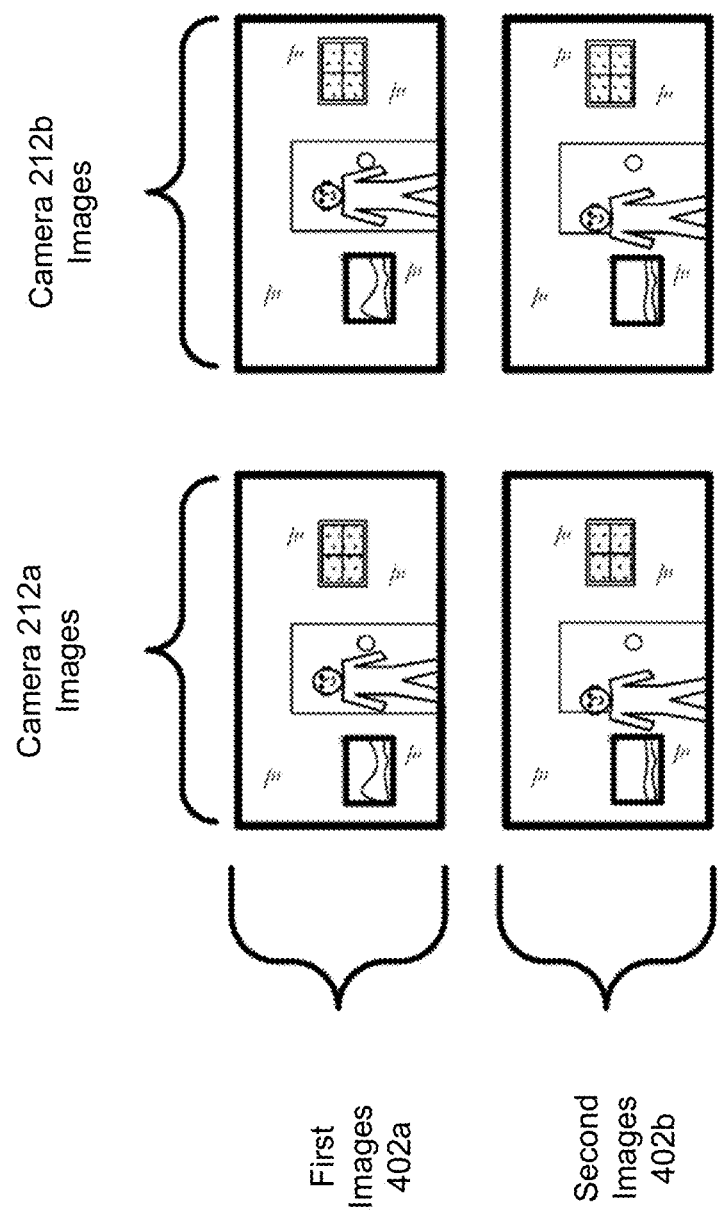

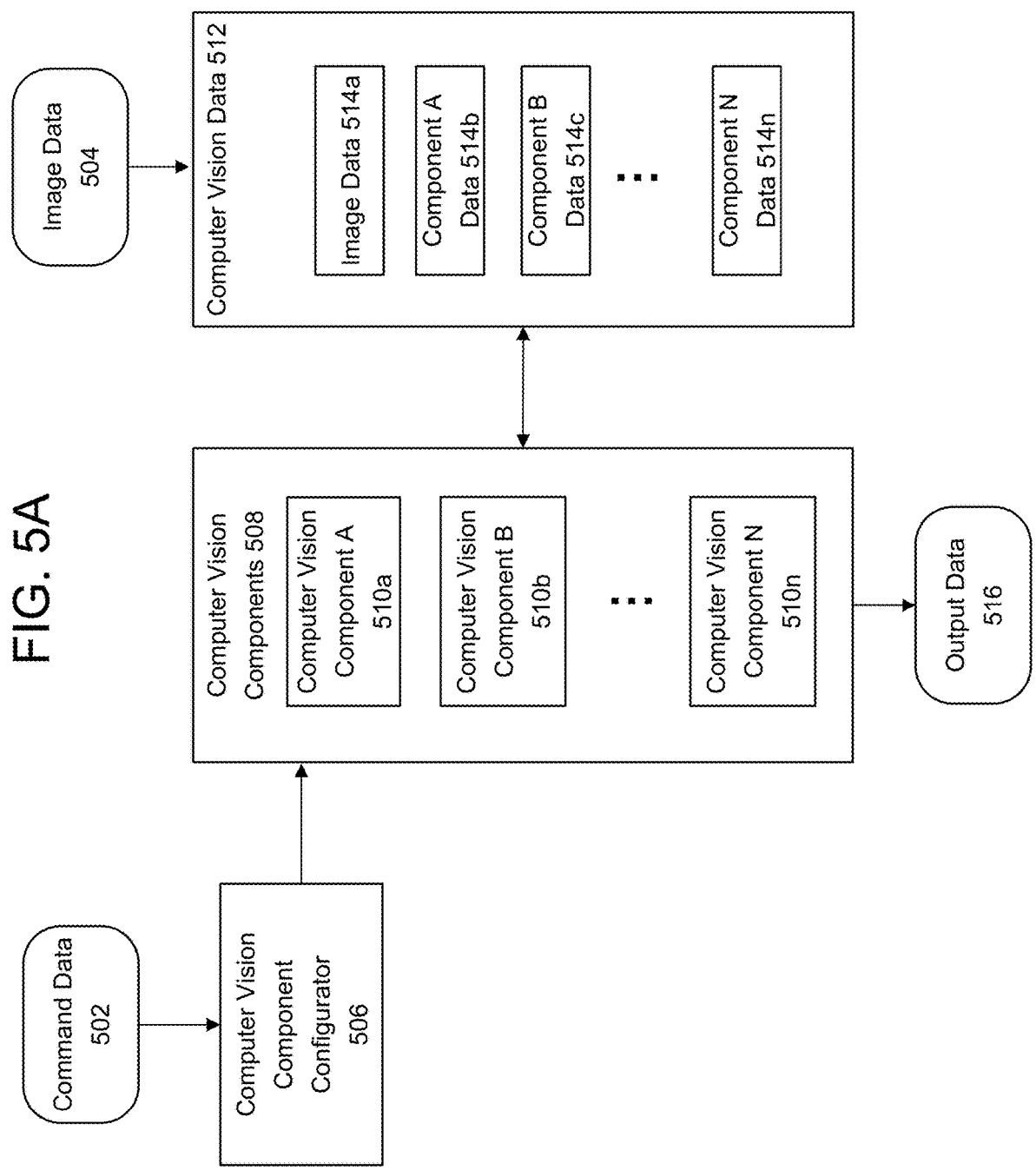

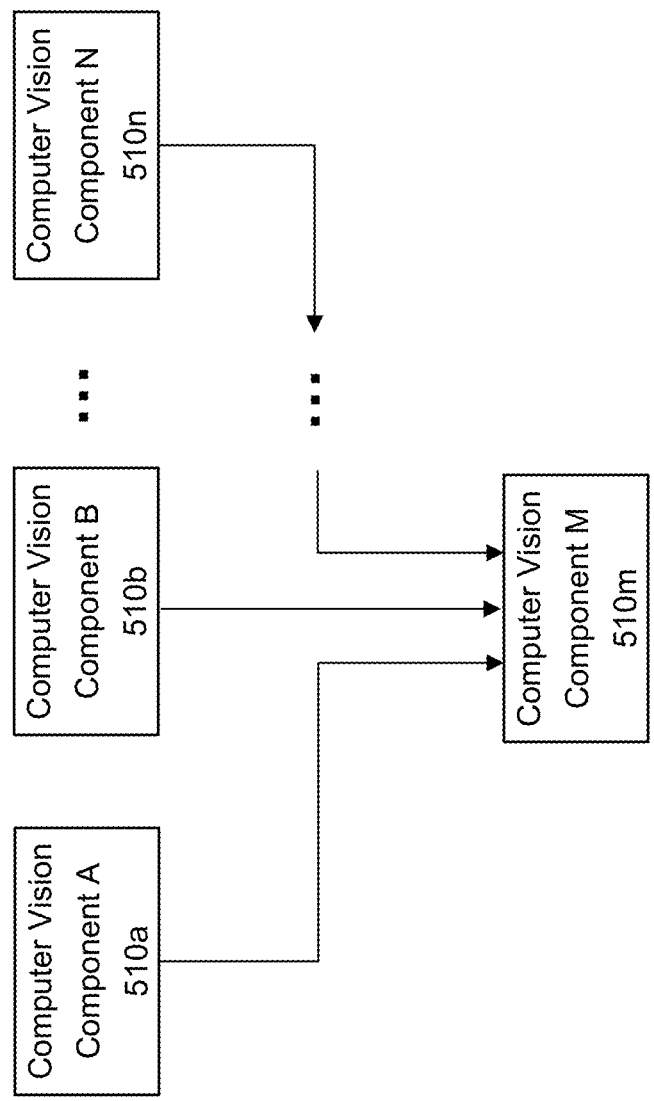

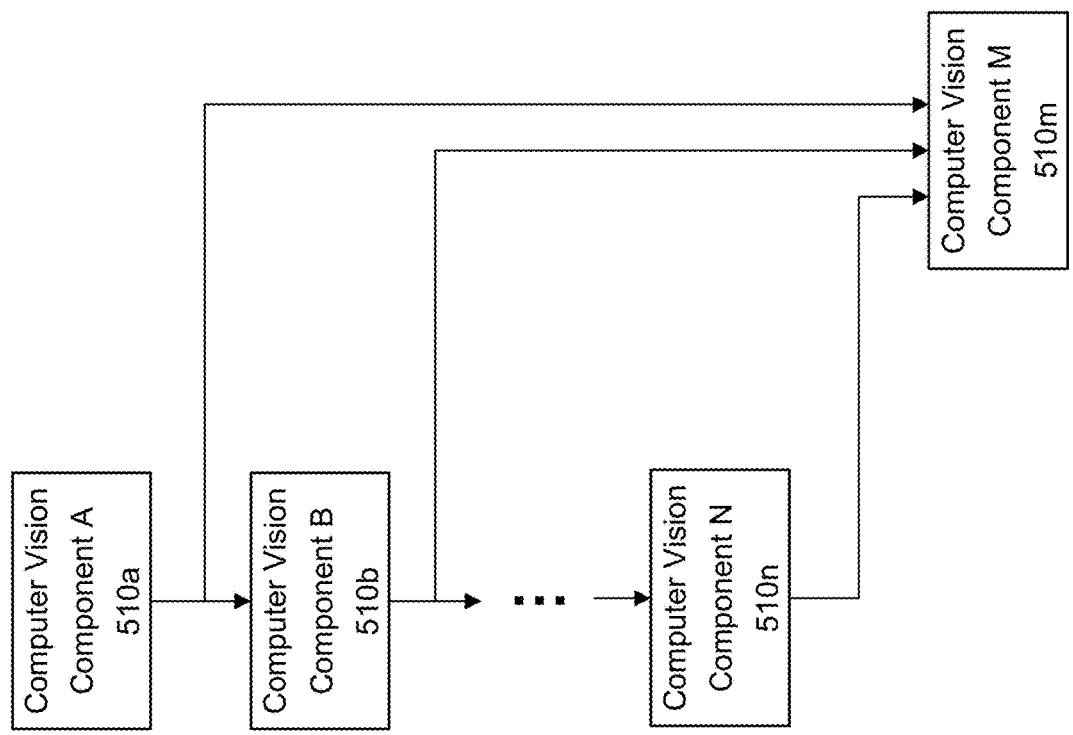

AUTONOMOUSLY MOTILE DEVICE WITH COMPUTER VISION

BACKGROUND

A computing device may be an autonomously motile device and may include at least one camera for capturing images, which may include representations of objects, in an environment of the computing device. Techniques may be used to process image data received from a camera to determine one or more properties of the object. The device may perform further actions based on the determined properties, such as causing movement of the computing device and/or camera of the computing device.

BRIEF DESCRIPTION OF DRAWINGS

For a more complete understanding of the present disclosure, reference is now made to the following description taken in conjunction with the accompanying drawings.

FIG. 1 illustrate as system and method for processing images according to embodiments of the present disclosure.

FIGS. 2A, 2B, and 2C illustrate views of an autonomously motile device according to embodiments of the present disclosure.

FIGS. 4A, 4B, and 4C illustrate images captured by an autonomously motile device in an environment according to embodiments of the present disclosure.

FIGS. 5A and 5B illustrate components for image processing by an autonomously motile device according to embodiments of the present disclosure.

FIGS. 6A, 6B, and 6C illustrate computer vision components according to embodiments of the present disclosure.

DETAILED DESCRIPTION

Figure 2B:
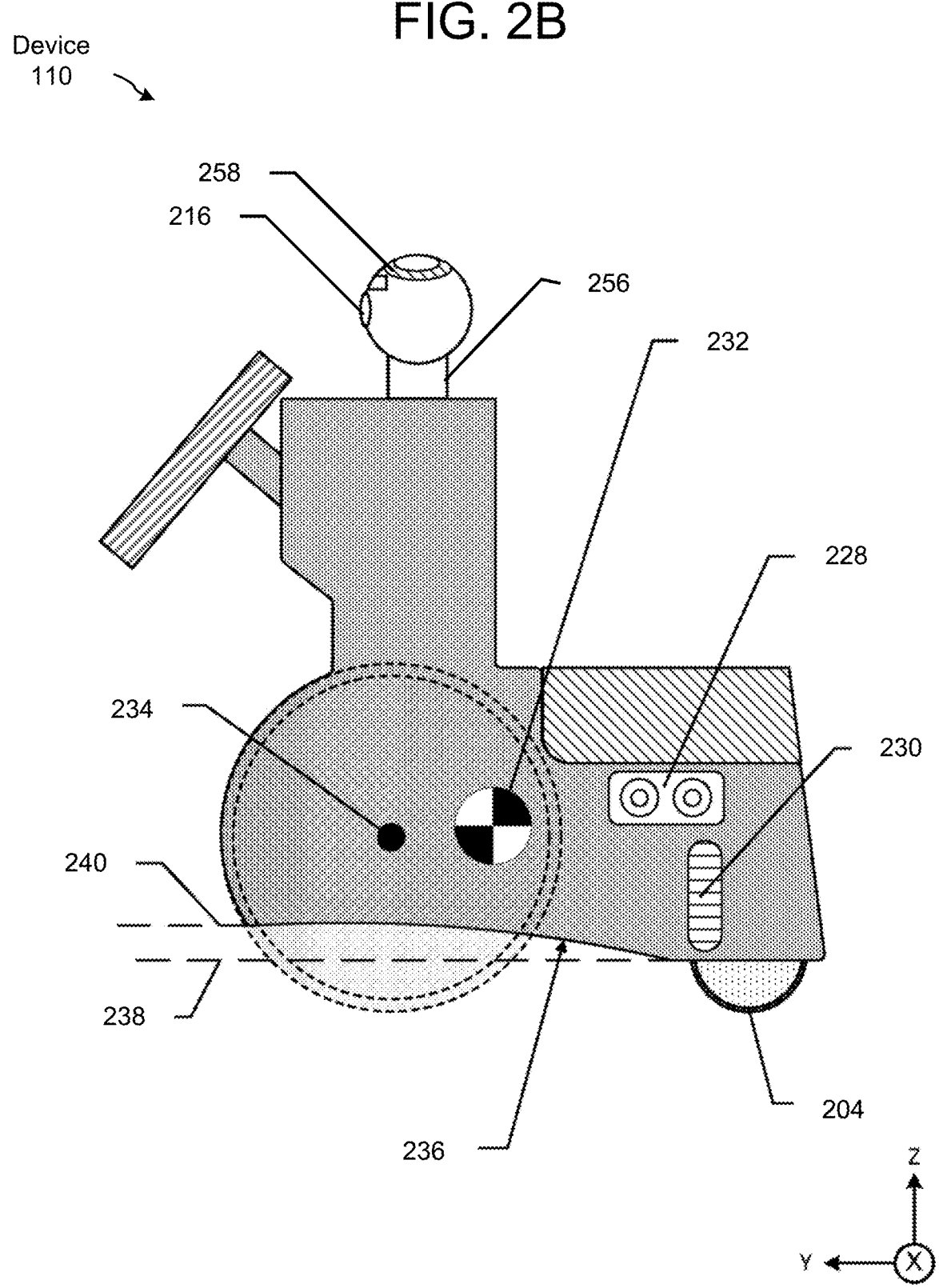

A device such as an autonomously motile device—e.g., a robot—may be a device capable of movement of itself, and/or of components of itself, within an environment. The device may include, among other components, one or more cameras that each may include an image sensor, such as a charged-coupled device (CCD), configured to convert incident light into corresponding image data that represents one or more objects in the environment of the device. Using computer vision techniques described herein, the device may process the image data received from the one or more cameras to determine various properties corresponding to objects represented in the image data, such as the presence, identity, and/or orientation of objects represented in the image data. Objects, as the term is used herein, may refer to humans, pets, other robots, furniture, walls, doors, or any other object present in the environment of the device.

Upon determining a property corresponding to an object present in the environment, the device may determine an output corresponding to the property and/or perform one or more additional actions associated with the output. For example, the device may include a plurality of lights that each indicate a particular direction relative to the device; device may determine an output associated with illuminating one of the lights that corresponds to the direction of the object. The device may instead or in addition move in the environment in accordance with movement of the object and/or may cause movement of one or more components of the device, such as movement of one or more cameras of the device, in accordance with the movement. For example, if a user associated with the device is participating in a video call using the device, and if the user moves in the environment, the device may move itself and/or a camera of the device to keep the user in view of the camera. If other humans are present in the environment, as described herein, the device may differentiate between the user and the other humans to keep the user, but not necessarily the other humans, in view.

In some embodiments, an autonomously motile device instead or in addition determines an output corresponding to movement in its environment in response to determining the direction of the user. For example, the autonomously motile device may move one or more of its component(s), such as a display screen and/or a camera, to face the determined direction of the user, speaker, and/or event. The autonomously motile device may instead or in addition rotate in place to face the determined direction of the user. The autonomously motile device may further, instead or in addition, move in a direction in the environment in response to determining the direction of the user; this movement may include moving toward the user, moving away from the user, and/or moving perpendicularly with respect to the user. The autonomously motile device may be capable of performing only a first subset of these types of motion and may be incapable of performing a second subset of these types of motion. For example, the autonomously motile device may move a display of the device to face the direction of the user but may be incapable of moving itself in the environment toward the user.

The autonomously motile device may be configured to perform image processing. Image processing may include various operations to data captured by one or more image sensors such as a camera, infrared sensor, etc. Such image processing operations may include processing of the image data so that it can be used for downstream operations such as computer vision. Image processing may include, for example, additions and subtractions of image data that can be used for object detection, windowing of a detected object, image segmentation, exposure duration determination, pixel correction, lens correction, geometric correction, data compression, generating a histogram of the pixel information, automatic exposure control, automatic gain control, automatic white balance, de-mosaicing, smoothing, edge enhancement, blob identification, or image thresholding, ambient light determination, image resizing/compression, image enhancement (such as gray level and contrast manipulation, noise reduction, edge crispening and sharpening, filtering, interpolation and magnification, pseudo coloring, or the like), image restoration (such as filtering the observed image to minimize the effect of degradations), image rectification, illumination correction, binarization, etc. Computer vision may include processes that can be used to analyze an image and extract, deduce or learn information about that image. Computer vision may include, for example, object detection, object tracking, position estimation, face detection, head tracking, body part recognition, body part position determination, gesture determination, gesture tracking, multiple image stereo processing, three dimensional image capture, image disparity processing, metadata tagging of the image data, symbol reading, optical character recognition (OCR), image fusion, sensor fusion, etc.

The operations discussed herein (for example computer vision or other operations) may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

The above-described determination of one or more properties of an object in the environment may be performed in a series of steps by two or more different computer vision components, wherein each computer vision component determines particular computer vision data based on image data from a camera and/or a result determined by a different computer vision component. Such an arrangement of computer vision components may be referred to as a "pipeline," wherein a first computer vision component in a first stage of the pipeline determines first data, and a second computer vision component in a second stage of the pipeline processes the first data (after it is determined by the first computer vision component) to determine second data. In this example, the second computer vision component may be said to be dependent upon the first computer vision component—that is, the second computer vision component processes the first data only after the first computer vision component has determined it.

Different commands to the autonomously motile device may, however, require different computer vision outputs and involve different computer vision components. A first command may require, for example, identification of a face of a particular person, while a second command does not. Thus, using an identification component to process image data to recognize a face while responding to the second command may unnecessarily consume computing resources.

Various embodiments of the present disclosure, therefore, determine and configure two or more computer vision components to process image data in response to a particular command; the computer vision components may be used to determine computer vision outputs used to execute the command. A first command may correspond to a first set of computer vision components, while a second command may correspond to a second set of computer vision components. The second set of components may have some components that are common to the first set and other components that are not present in the first set. Embodiments of the present invention may thus cause only the computer vision components relevant to a particular command to process image data in response to the command.

FIG. 1 illustrates a system that includes an autonomously motile device 110, which is described in greater detail below. In various embodiments, the autonomously motile device 110 is capable of autonomous motion using one or motors powering one or more wheels, treads, robotic limbs, or similar actuators. The autonomously motile device 110 may further be capable of three-dimensional motion (e.g., flight) using one or more rotors, wings, jets, electromagnetic field generators, or similar actuators. The motion may be linear motion and/or angular motion. The present disclosure is not limited to particular method of autonomous movement/motion. The device 110 may, for example, follow a user 102 around a room to thereby allow the user 102 easier access to features of the device 110, such as one or more cameras.

The device 110 may further include one or more display screens for displaying information to a user 102 and/or receiving touch input from a user. The device 110 may further include a microphone array including one or more microphones and one or more loudspeakers; the microphone array and loudspeakers may be used to receive audio data, such as an utterance, from the user 102. The utterance may be, for example, a command or request. The device 110 may also be used to output audio to the user 102, such as audio related to a command or audio related to a request.

The device 110 may further include one or more sensors, as explained in greater detail below with respect to FIG. 11D. These sensors may include, but are not limited to, an accelerometer, a gyroscope, a magnetic field sensor, an orientation sensor, a weight sensor, a temperature sensor, and/or a location sensor (e.g., a global-positioning system (GPS) sensor or a Wi-Fi round-trip time sensor). The device may further include a computer memory, a computer processor, and one or more network interfaces. The device 110 may be, in some embodiments, a robotic assistant or "robot" that may move about a room or rooms to provide a user with requested information or services. In other embodiments, the device 110 is capable of rotation but not linear motion; the device 110 may be mounted or placed on a surface or floor, for example, and may rotate in place to face a user 102. The disclosure is not, however, limited to only these devices or components, and the device 110 may include additional components without departing from the disclosure.

In various embodiments, with reference to FIG. 1, the autonomously motile device 110 determines (120) command data corresponding to a property of an object in an environment. The command data may include a desired outcome, such as a command to interact with a user (e.g., receive data from a user and/or output data to a user), or a list of desired outputs, such as a user identifier and/or body-orientation data. The command data may originate from a command of a user, such as a user utterance to the device 110 of "Follow me." The command data may instead or in addition be determined by the device 110 itself. For example, a user 102 may speak a command of "follow me." The device 110 may detect the audio, perform speech processing on the resulting audio data (either on its own or with the assistance of remote system 1200) to determine that the speech corresponds to a command for device 110 to follow user 102.

The property of the object in the environment may include, for example, a position of a human relative to the device 110, a position of a face relative to the device 110, an orientation of a human relative to the device (e.g. a direction that the human is facing relative to the device 110), an orientation of a face relative to the device, an identifier corresponding to the human, and/or an identifier corresponding to the face. The present disclosure is not, however, limited to any particular property of the object.

The device 110 may then determine (122) that the command data corresponds to at least first and second computer vision components. In other words, the device 110 determines which computer vision components may be used to produce the desired output that represents the property(s). For example, if the command data corresponds to following a human in the environment of the device, the device 110 may determine that an object identifying component will process the image data to determine where the user is located and/or if the user changes position in the environment. If the command data corresponds to interacting with a particular human, the device 110 may determine that an identification component will process the image data to recognize a user in the image, for example to ensure the device 110 follows the user 102 who initiated the command rather than some other person.

The device 110 may then determine (124) that first output data of the first computer vision component corresponds to first input data of the second computer vision component. In other words, the second computer vision component depends on the output of the first computer vision component such that the second computer vision component begins processing data when the first computer vision component completes its processing and determines the first output data. Processing the image data may further include other computer vision components, and the device 110 may similarly determine further dependencies therebetween.

The device 110 may then determine (126) image data including a representation of the object (e.g., the user 102). As described in greater detail below, the image data may include data from one or more cameras. The image data may include data from two cameras, for example, that are mounted on the device 110 such that they are separated by a horizontal distance. Each camera may thus determine a different representation of the object in accordance with the distance. Such a pair of cameras may be referred to as a stereo pair of cameras comprising a left camera and a right camera, though the present disclosure is not limited to any particular arrangement of camera components.

The device 110 may then determine (128), using the first computer vision component and the image data, first output data. For example, the first computer vision component may be a human/face detection component, and the first output data may include a box corresponding to a human represented in the image data and a box corresponding to a face represented in the image data.

The device 110 may then determine (130), using the second computer vision component, the first output data, and the image data, second output data representing the property. For example, the second computer vision component may be an object tracking component, and the second output data may be an identifier corresponding to a human in the environment. The device 110 may, in some embodiments, use this identifier to, for example, move in a direction toward a particular human in an environment.

Figure 2C:
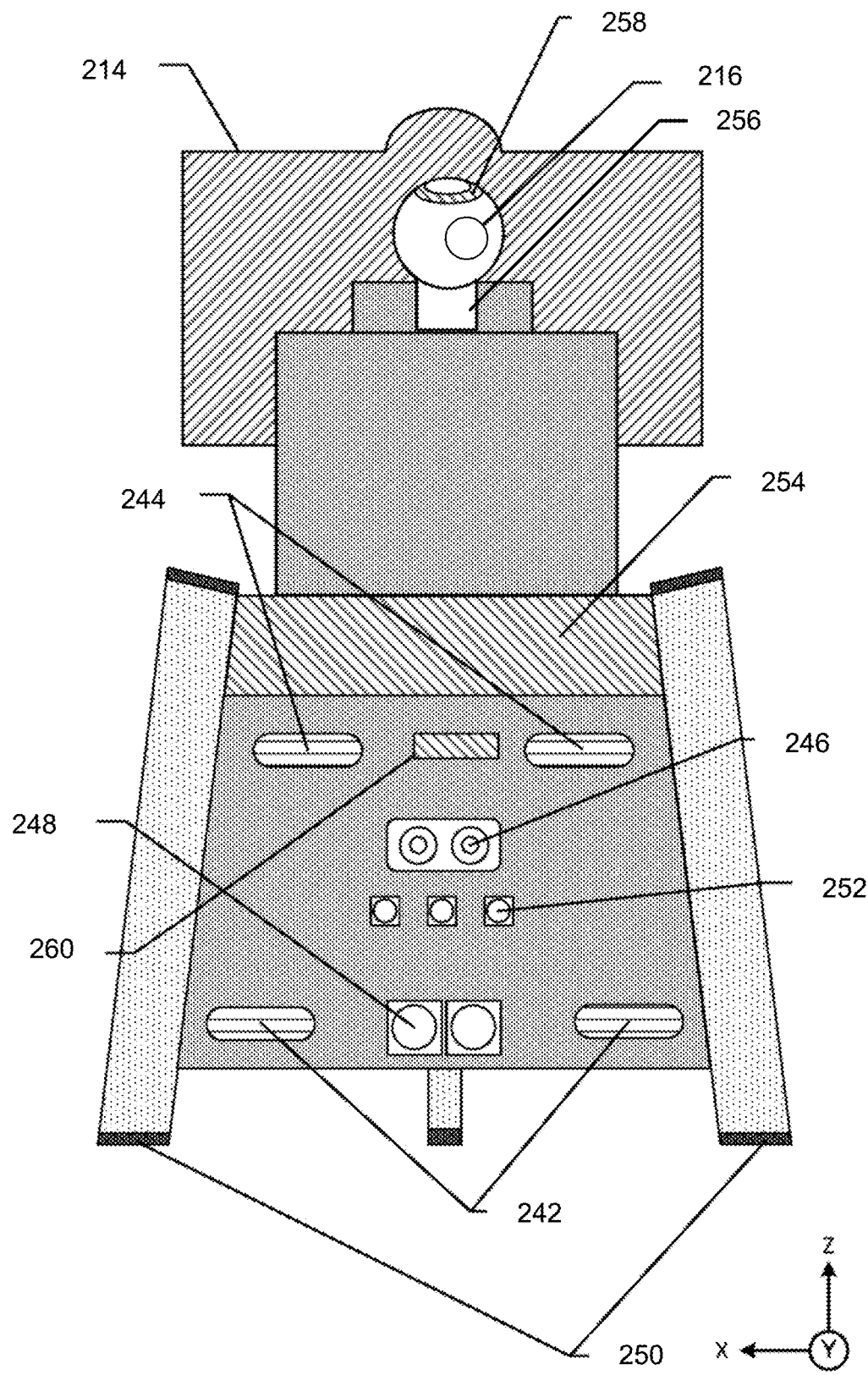

FIGS. 2A, 2B, and 2C illustrate views of an autonomously motile device configured to process image data according to embodiments of the present disclosure. FIG. 2A illustrates a front view of the autonomously motile device 110 according to various embodiments of the present disclosure. The device 110 includes wheels 202 that are disposed on left and right sides of the device 110. The wheels 202 may be canted inwards toward an upper structure of the device 110. In other embodiments, however, the wheels 202 may be mounted vertically (e.g., not canted) or canted away from the upper structure. A caster 204 (e.g., a smaller wheel) may disposed along a midline of the device 110. As mentioned above, the wheels and/or motors driving the wheels may create noise 108 that may be transmitted through the device 110 to a loudspeaker 220.

The front section of the device 110 may include a variety of external sensors. A first set of optical sensors 206, for example, may be disposed along the lower portion of the front of the device 110, and a second set of optical sensors 208 may be disposed along an upper portion of the front of the device 110. A microphone array 210 may be disposed on a top surface of the device 110; the microphone array 210 may, however, be disposed on any surface of the device 110.

One or more cameras or other image capture components (such as infrared sensor or the like) 212 may be mounted to the front of the device 110; two cameras 212a and 212b, for example, may be used to provide for stereo vision. The distance between the two cameras 212 may be, for example, 5-15 centimeters; in some embodiments, the distance is 10 centimeters. In some embodiments, the cameras 212 may exhibit a relatively wide horizontal field-of-view 308. For example, the horizontal field-of-view 308 may be between 900 and 110°. A relatively wide field-of-view 308 may provide for easier detection of moving objects, such as users or pets, which may be in the path of the device 110. Also, the relatively wide field-of-view 308 may provide for the device 110 to more easily detect objects when rotating or turning.

The cameras 212, which may be used for navigation as described herein, may be of different resolution from, or sensitive to different wavelengths than, other cameras used for other purposes, such as video communication. For example, the navigation cameras 212 may be sensitive to infrared light allowing the device 110 to operate in darkness or semi-darkness, while a camera 216 mounted on a mast 256 (as shown in FIGS. 2B and 2C) may be sensitive to visible light and may be used to generate images suitable for viewing by a person. A navigation camera 212 may have a resolution of at least 300 kilopixels each, while the camera 216 may have a resolution of at least 10 megapixels. In other implementations, navigation may utilize a single camera. The camera 216 that is mounted on the mast 256 that may extend vertically with respect to the device 110.

The cameras 212 may operate to provide stereo images of the environment, the user, or other objects. For example, an image from the camera 216 disposed above the display 214 may be accessed and used to generate stereo-image data corresponding to a face of a user. This stereo-image data may then be used for user identification, gesture recognition, gaze tracking, and other uses. In some implementations, a single camera 216 may be disposed above the display 214.

The display 214 may be mounted on a movable mount. The movable mount may allow the display to move along one or more degrees of freedom. For example, the display 214 may tilt, pan, change elevation, and/or rotate. As mentioned above, some or all of these movements may create noise 108 that may be transmitted through the device 110 to a loudspeaker 220. In some embodiments, the display 214 may be approximately 20 centimeters as measured diagonally from one corner to another. An ultrasonic sensor 218 may be mounted on the front of the device 110 and may be used to provide sensor data that is indicative of objects in front of the device 110. Additional cameras 215a, 215b may be mounted on a housing of the display 214.

One or more loudspeakers 220 may be mounted on the device 110, and the loudspeakers 220 may have different audio properties. For example, low-range, mid-range, and/or high-range loudspeakers 220 may be mounted on the front of the device 110. The loudspeakers 220 may be used to provide audible output such as alerts, music, human speech such as during a communication session with another user, and so forth.

Other output devices 222, such as one or more lights, may be disposed on an exterior of the device 110. For example, a running light may be arranged on a front of the device 110. The running light may provide light for operation of one or more of the cameras, a visible indicator to the user that the device 110 is in operation, or other such uses.

One or more floor optical-motion sensors 224, 226 may be disposed on the underside of the device 110. The floor optical-motion sensors 224, 226 may provide indication indicative of motion of the device 110 relative to the floor or other surface underneath the device 110. In some embodiments, the floor optical-motion sensors 224, 226 comprise a light source, such as light-emitting diode (LED) and/or an array of photodiodes. In some implementations, the floor optical-motion sensors 224, 226 may utilize an optoelectronic sensor, such as an array of photodiodes. Several techniques may be used to determine changes in the data obtained by the photodiodes and translate this into data indicative of a direction of movement, velocity, acceleration, and so forth. In some implementations, the floor optical-motion sensors 224, 226 may provide other information, such as data indicative of a pattern present on the floor, composition of the floor, color of the floor, and so forth. For example, the floor optical-motion sensors 224, 226 may utilize an optoelectronic sensor that may detect different colors or shades of gray, and this data may be used to generate floor characterization data.

FIG. 2B illustrates a side view of the device 110 according to various embodiments of the present disclosure. In this side view, the left side of the device 110 is illustrated. An ultrasonic sensor 228 and an optical sensor 230 may be disposed on either side of the device 110. The disposition of components of the device 110 may be arranged such that a center of gravity 232 is located between a wheel axle 234 of the front wheels 202 and the caster 204. Such placement of the center of gravity 232 may result in improved stability of the device 110 and may also facilitate lifting by a carrying handle.

In this illustration, the caster 204 is shown in a trailing configuration, in which the caster 204 is located behind or aft of the wheel axle 234 and the center of gravity 232. In another implementation (not shown) the caster 204 may be in front of the axle of the wheels 202. For example, the caster 204 may be a leading caster 204 positioned forward of the center of gravity 232.

The device 110 may encounter a variety of different floor surfaces and transitions between different floor surfaces during the course of its operation. A contoured underbody 236 may transition from a first height 238 at the front of the device 110 to a second height 240 that is proximate to the caster 204. This curvature may provide a ramp effect such that, if the device 110 encounters an obstacle that is below the first height 238, the contoured underbody 236 helps direct the device 110 over the obstacle without lifting the driving wheels 202 from the floor.

FIG. 2C illustrates a rear view of the device 110 according to various embodiments of the present disclosure. In this view, as with the front view, a first pair of optical sensors 242 may be located along the lower edge of the rear of the device 110, while a second pair of optical sensors 244 are located along an upper portion of the rear of the device 110. An ultrasonic sensor 246 may provide proximity detection for objects that are behind the device 110.

Charging contacts 248 may be provided on the rear of the device 110. The charging contacts 248 may include electrically conductive components that may be used to provide power (to, e.g., charge a battery) from an external source such as a docking station to the device 110. In other implementations, wireless charging may be utilized. For example, wireless inductive or wireless capacitive charging techniques may be used to provide electrical power to the device 110.

In some embodiments, the wheels 202 may include an electrically conductive portion 250 and provide an electrical conductive pathway between the device 110 and a charging source disposed on the floor. One or more data contacts 252 may be arranged along the back of the device 110. The data contacts 252 may be configured to establish contact with corresponding base data contacts within the docking station. The data contacts 252 may provide optical, electrical, or other connections suitable for the transfer of data.

Other output devices 260, such as one or more lights, may be disposed on an exterior of the back of the device 110. For example, a brake light may be arranged on the back surface of the device 110 to provide users an indication that the device 110 is slowing or stopping.

The device 110 may include a modular payload bay 254. In some embodiments, the modular payload bay 254 is located within the lower structure. The modular payload bay 254 may provide mechanical and/or electrical connectivity with the device 110. For example, the modular payload bay 254 may include one or more engagement features such as slots, cams, ridges, magnets, bolts, and so forth that are used to mechanically secure an accessory within the modular payload bay 254. In some embodiments, the modular payload bay 254 includes walls within which the accessory may sit. In other embodiments, the modular payload bay 254 may include other mechanical engagement features such as slots into which the accessory may be slid and engage. The device 110 may further include a mast 256, which may include a light 258. The mast 256 may extend and retract vertically with respect to the device 110. The light 258 may activate (e.g., emit light) to indicate activity of the device 110, such as processing audio data in response to detection of a wakeword.

Figure 3:
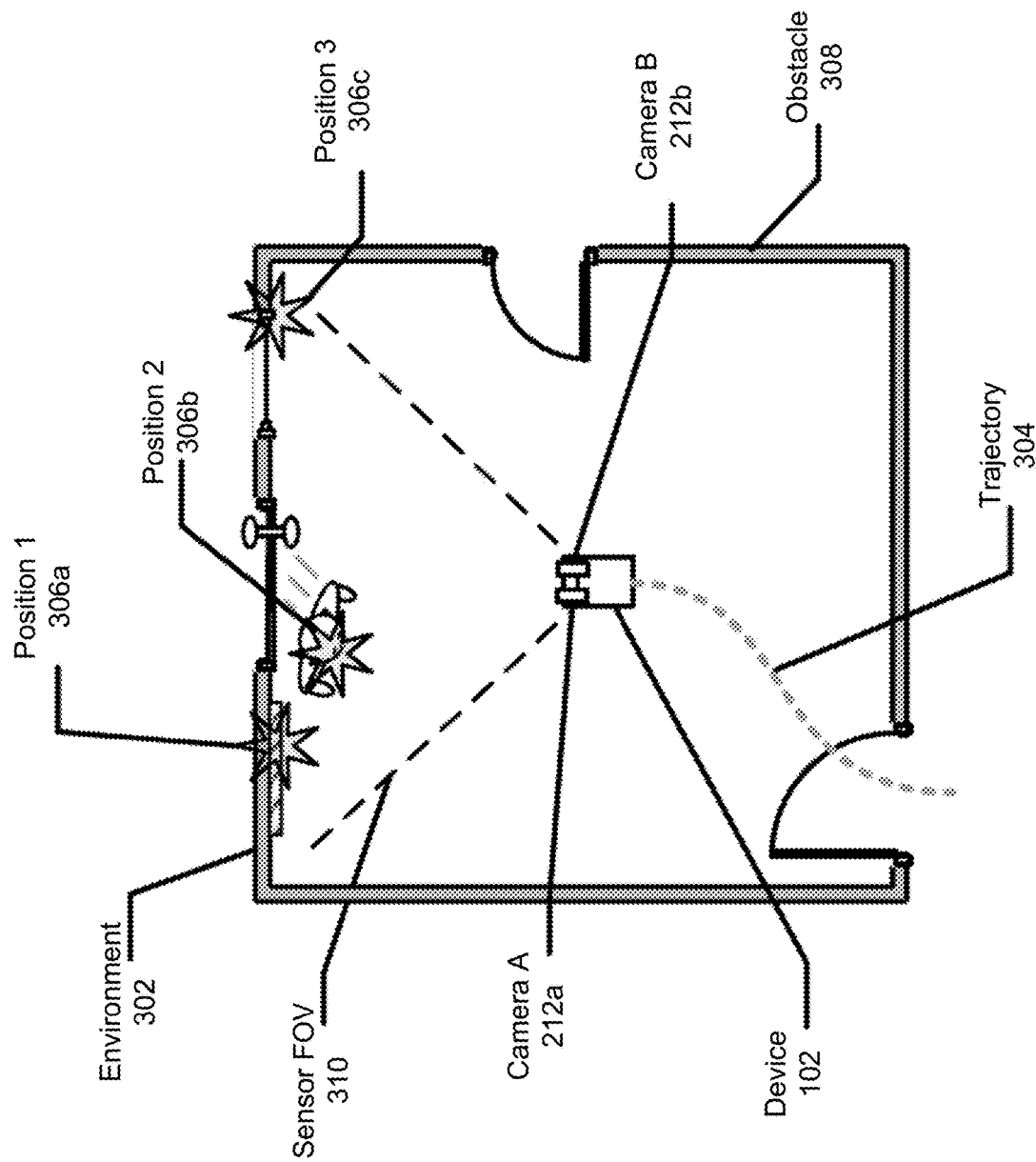
FIG. 3 illustrates a view of an autonomously motile device in an environment according to embodiments of the present disclosure.

As shown in FIG. 3, the autonomously motile device 110 may move in an environment 302. The motion of the autonomously motile device 110 may be described as a trajectory 304, as shown in FIG. 3. In some implementations, the trajectory 304 may comprise a series of poses. Each pose may be indicative of a particular location with respect to a plurality of orthogonal axes and rotation with respect to individual ones of the axes. For example, the pose may comprise information with respect to six degrees of freedom indicative of coordinates in three-dimensional space with respect to a designated origin and rotation with respect to each of the three axes.

One or more motors or other actuators enable the autonomously motile device 110 to move from one location in the environment 302 to another. For example, a motor may be used to drive a wheel attached to a chassis of the autonomously motile device 110, which causes the autonomously motile device 110 to move. The autonomously motile device 110 may turn, move forward, move backward, and so forth. In another example, actuators may move legs allowing the autonomously motile device 110 to walk.

Figure 4B:
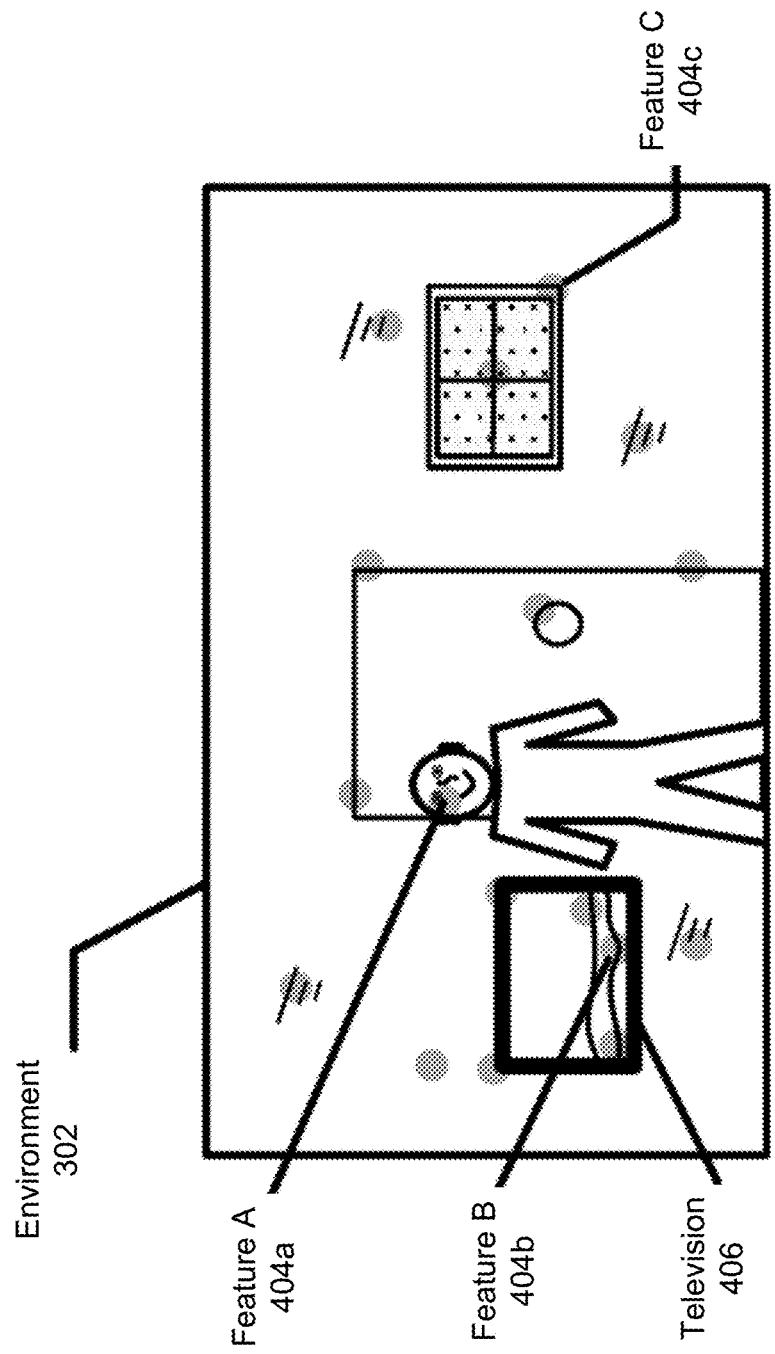
Figure 11A:
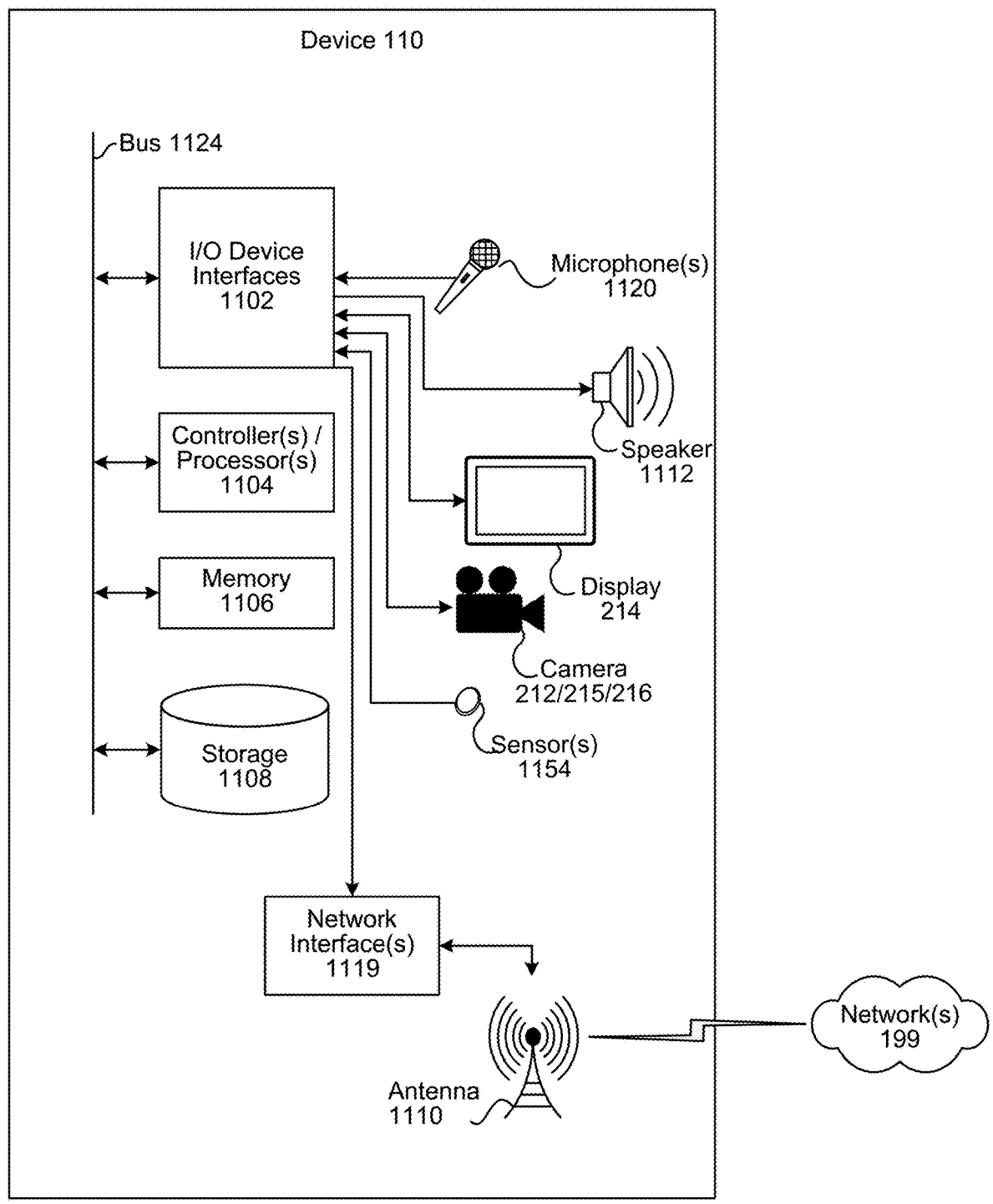
FIG. 11A illustrates a block diagram of an autonomously motile device according to embodiments of the present disclosure.

The autonomously motile device 110 may include one or more sensors 1154 (shown below in FIG. 11D). For example, the sensors 1154 may include a first camera 212a, a second camera 212b, an inertial measurement unit (IMU) 1180, microphones, time-of-flight sensors, and so forth. The first camera 212a and the second camera 212b may be mounted to a common rigid structure that maintains a relative distance between the cameras 212. An IMU 1180 may be attached to this common rigid structure, or one of the cameras affixed thereto. The first camera 212a and the second camera 212b may be arranged such that a sensor field-of-view 310 of the first camera 212a overlaps at least in part a sensor field-of-view of the second camera 212b. The sensors 1154 may generate sensor data 514e (which may be stored in storage 1108 as illustrated in FIG. 11C discussed below). The sensor data 514e may include image data 514a acquired by the first camera 212a and the second camera 212b. For example, as shown in FIG. 4A, a pair of images 402 may comprise image data 514a from the first camera 212a and the second camera 212b that are acquired at the same time. For example, a first pair of images 402a are acquired at time $t_1$ and a second pair of images 402b are acquired at time $t_2$. The sensors 1154 are discussed in more detail with regard to FIG. 11D.

During its operation, the autonomously motile device 110 may determine input data. The input data may include or be based at least in part on sensor data 514e from the sensors 1154 onboard the autonomously motile device 110. In one implementation, a speech processing component 1137 may process raw audio data obtained by a microphone on the autonomously motile device 110 and produce input data. For example, the user may say "robot, come here" which may produce input data "come here". In another implementation, the input data may comprise information such as a command provided by another computing device, such as a smartphone or tablet computer.

Figure 11B:
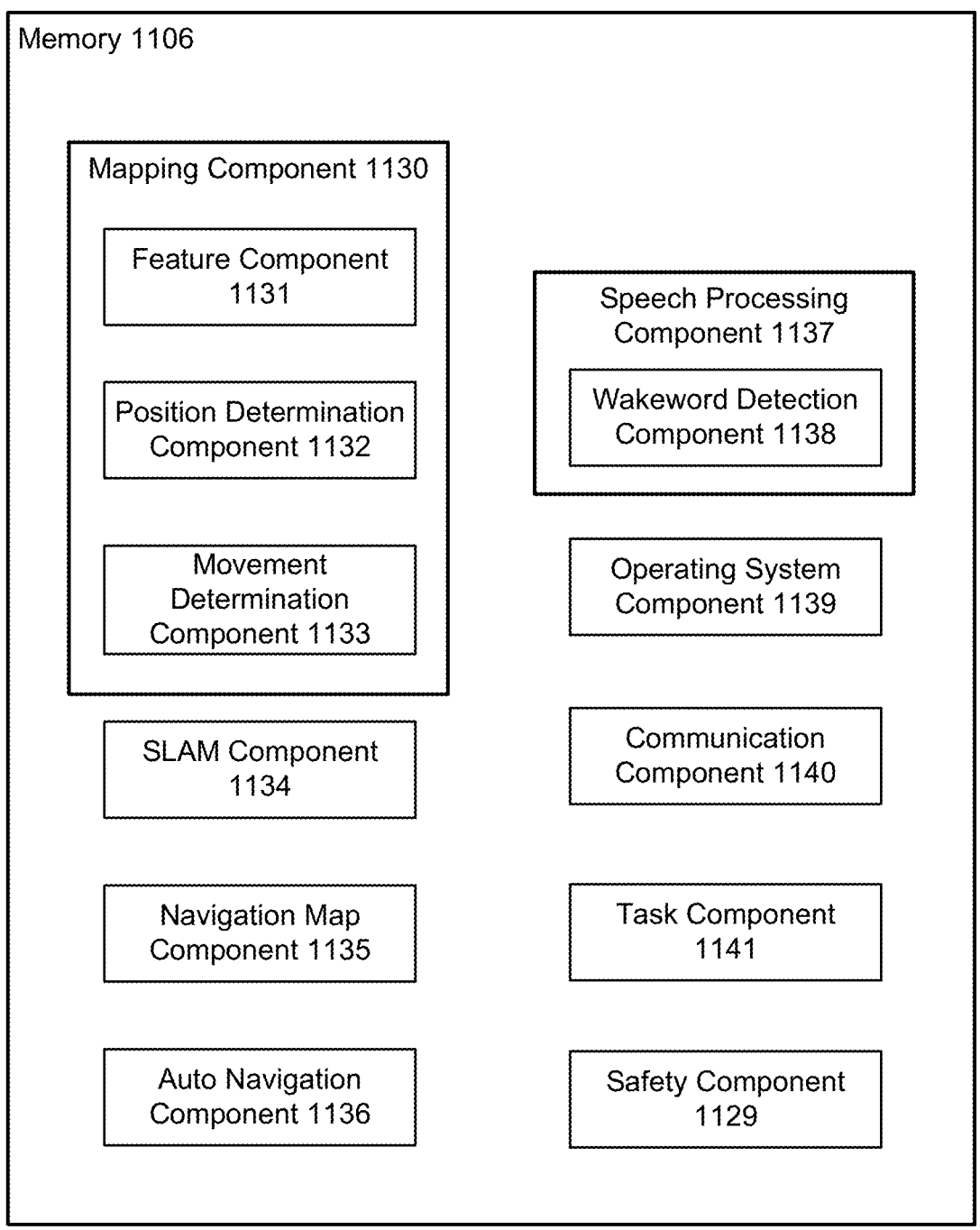
FIG. 11B illustrates components that may be stored in a memory of an autonomously motile device according to embodiments of the present disclosure.
Figure 11C:
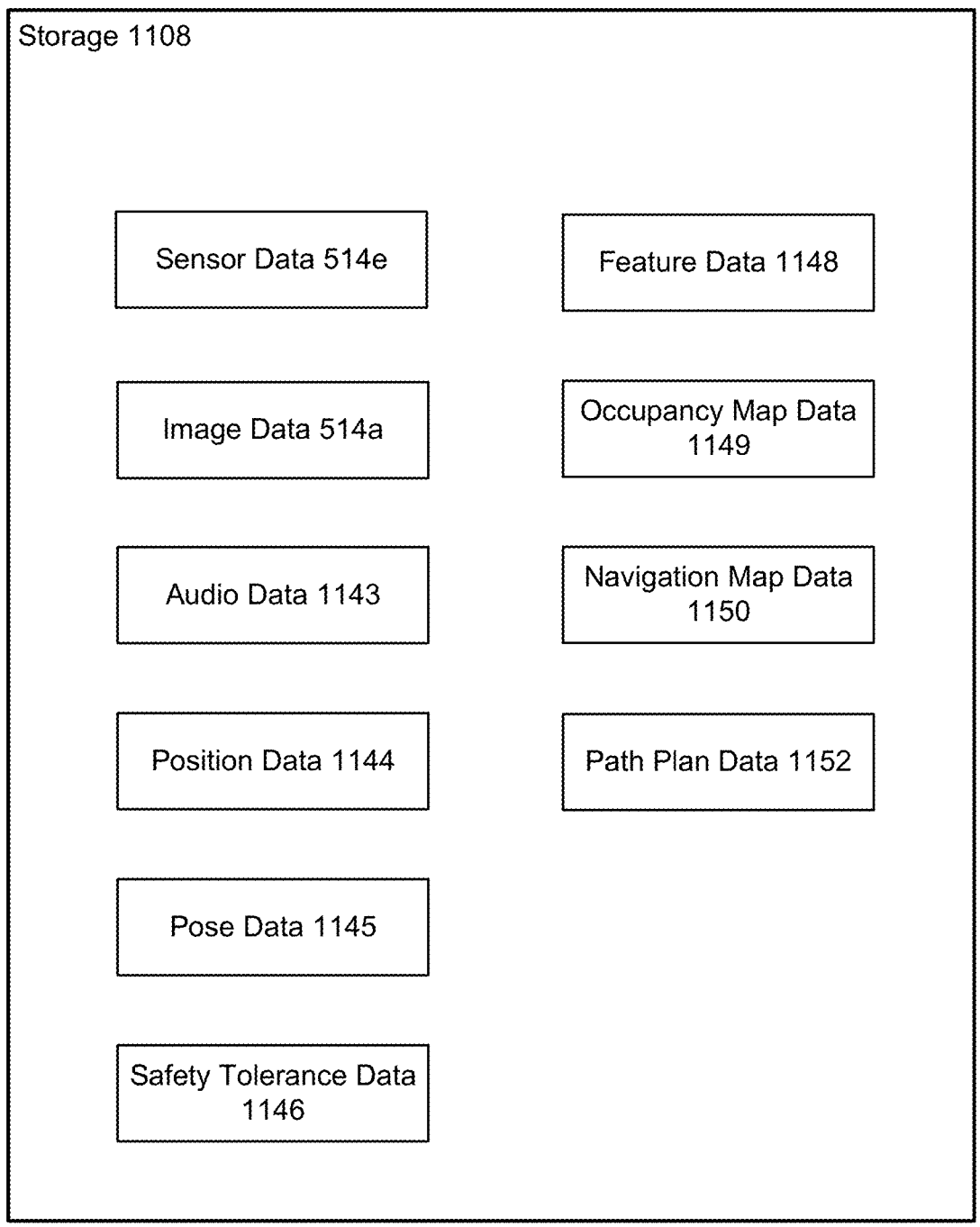
FIG. 11C illustrates data that may be stored in a storage of an autonomously motile device according to embodiments of the present disclosure.

A mapping component 1130 (which may be included in memory 1106 as illustrated in FIG. 11B and as further discussed below) determines a representation of the environment 302 that includes the obstacles 308 and their location in the environment 302. During operation the mapping component 1130 uses the sensor data 514e from various sensors 1154 to determine information such as where the autonomously motile device 110 is, how far the autonomously motile device 110 has moved, the presence of obstacles 308, where those obstacles 308 are, and so forth.

A feature component 1131 processes at least a portion of the image data 514a to determine first feature data 1148. The first feature data 1148 is indicative of one or more features 404 that are depicted in the image data 514a. For example, as shown in FIG. 2F, the features 404 may be edges of doors, shadows on the wall, texture on the walls, portions of artwork in the environment 302, and so forth. The environment 302 may include display devices that are capable of changing the images they portray. For example, a television 406 may be presented in the environment 302. The picture presented by the television 406 may also have features 404.

Various techniques may be used to determine the presence of features 404 in image data 514a. For example, one or more of a Canny detector, Sobel detector, difference of Gaussians, features from accelerated segment test (FAST) detector, scale-invariant feature transform (SIFT), speeded up robust features (SURF), trained convolutional neural network, or other detection methodologies may be used to determine features 404 in the image data 514a. A feature 404 that has been detected may have an associated descriptor that characterizes that feature 404. The descriptor may comprise a vector value in some implementations. For example, the descriptor may comprise data indicative of the feature with respect to 256 different dimensions.

The first feature data 1148 may comprise information such the descriptor for the feature 404, the images that the feature 404 was detected in, location in the image data 514a of the feature 404, and so forth. For example, the first feature data 1148 may indicate that in a first image the feature 404 is centered at row 994, column 312 in the first image. These data and operations, along with those discussed below, may be used by the autonomously motile device 110, and/or other devices, to perform the operations described herein.

Figure 4C:
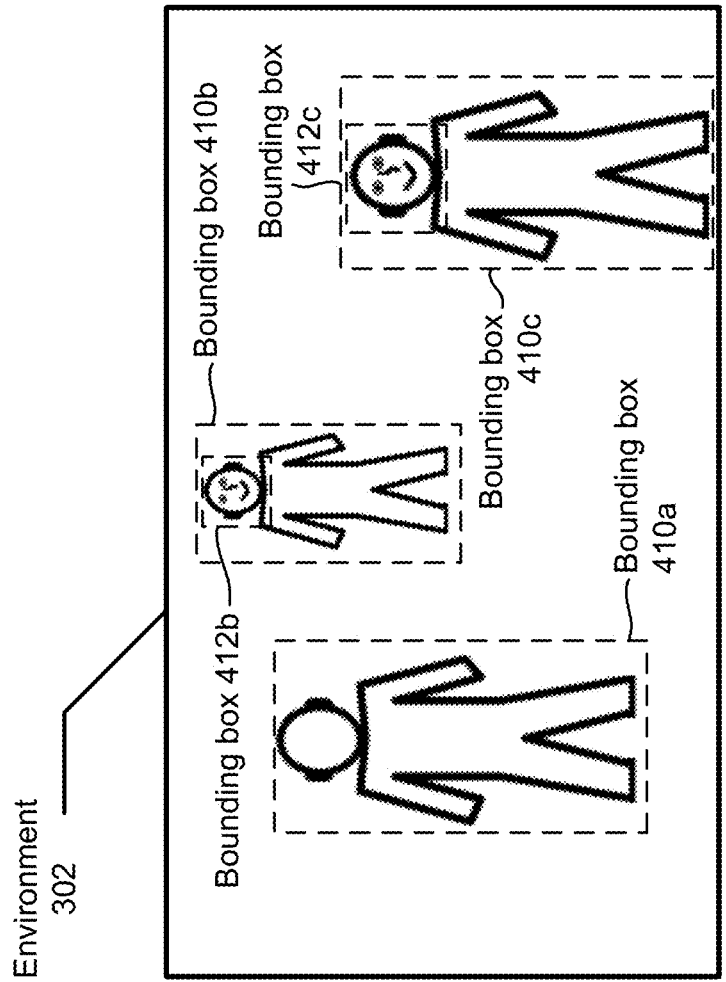

As shown in FIG. 4C, and as described in greater detail below, a component such as human/face detection component may process image data to determine bounding box data corresponding to bounding boxes which indicate where in an image a detected object may be located. For example, as illustrated the device 110 may determine bounding boxes around detected faces and/or bodies. As shown in FIG. 4C, a bounding box 410 may be determined for each detected body (such as bounding box 410a, bounding box 410b, and/or bounding box 410c) where the bounding box is a rectangle or other shape that circumscribes a representation of a human in the image data. Similarly, a bounding box 412 may be determined for each detected face (such as the bounding box 412b or bounding box 412c) is a rectangle or other shape that circumscribes a representation of a face in the image data. If a person is in view of a camera 212 but is turned such that their face is not visible to the camera 212, the autonomously motile device may determine a bounding box 410 for that person's body but not a bounding box 412 for the person's face (such as is the case with the bounding box 410a).

Figure 5B:
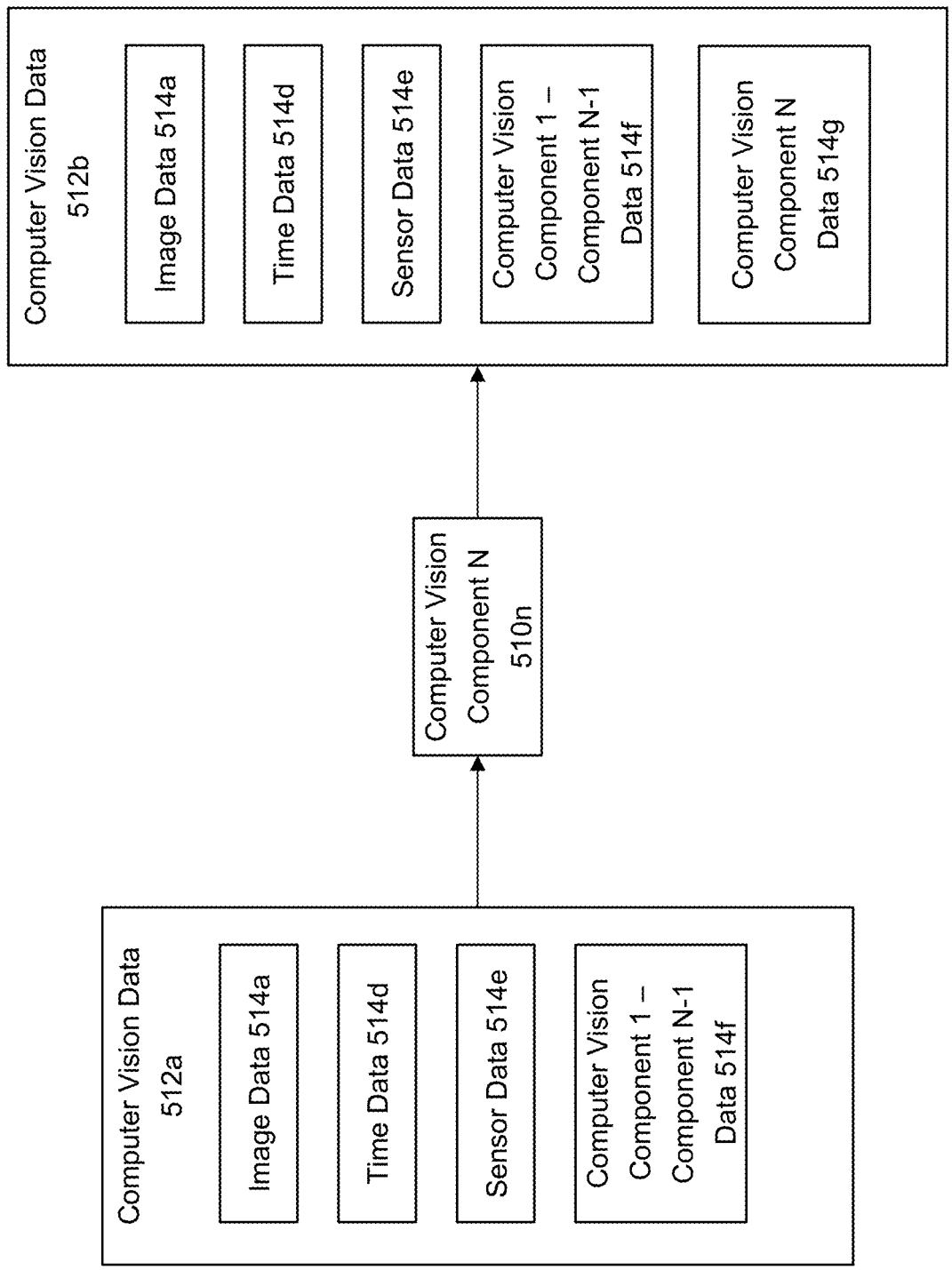

FIGS. 5A and 5B illustrate components for computer vision by an autonomously motile device according to embodiments of the present disclosure. Referring first to FIG. 5A, the device 110 may determine command data 502 corresponding to a command to process image data 504. The command data 502 may include a representation of a high-level command, such as "Follow," which corresponds to a command to move in a direction of a particular user 102. A computer vision component configurator 506 may receive the command data 502 and determine which outputs of a set of computer vision components 508 correspond to the command. In some embodiments, the command data 502 includes a list of the outputs instead of or in addition to the high-level command.

As mentioned above, possible outputs of the computer vision components 508 may include a position of a human relative to the device 110, a position of a face relative to the device 110, an orientation of a human relative to the device (e.g. a direction that the human is facing relative to the device 110), an orientation of a face relative to the device, an identifier corresponding to the human, and/or an identifier corresponding to the face. The computer vision component configurator 506 may determine the outputs by accessing a computer memory (such as the computer memory 1106 of FIG. 11A) that includes a predetermined list of outputs for each command received in the command data.

The computer vision component configurator 506 may then determine which computer vision components 510 will process image data 504 (and/or other data derived therefrom) to determine the required outputs. In some embodiments, the required computer vision components are similarly stored in the memory 1106 and associated with the command represented in the command data 502. In other embodiments, computer vision component configurator 506 determines the required computer vision components based on dependencies that exist between the computer vision components. For example, the computer vision component configurator 506 may determine that a first computer vision component 510a processes an output of a second computer vision component 510b. If, therefore, the first computer vision component 510a is used to produce an output specified in the command data 502, then the second computer vision component 510b may also be used to produce the output.

As described in greater detail below (with reference to, for example, FIG. 8A), the computer vision components 508 may include a number of different types of components 510 each capable of processing different types of input data to determine different types of output data. A given computer vision component 510 may process, as input, the image data 504 and/or data output by one or more other computer vision components 510. The computer vision component configurator 506 may determine, for the given computer vision component 510, which other computer vision components 510, if any, produce output data that is processed by the given computer vision component 510. A computer vision component 510 may begin to process data when one or more of its items of input data become available.

Input data for an computer vision component 510 and output data produced by the computer vision component 510 may be stored in computer vision data 512, which may be a part of the computer memory 1106. In various embodiments, the computer vision component configurator 506 may store input data 504 in the computer vision data 512 as part of a data structure capable of being accessed by the computer vision components 508. Each computer vision component 510 may begin processing input data when the data structure includes input data corresponding to the computer vision component 510 and, upon completion of processing, store any output data 514 into the data structure. Other computer vision components 510 may thus thereafter process the image data 504 and/or the output(s) of other computer vision components 510 and may similarly store corresponding output data into the data structure. The computer vision components 510 may thus continue to process data in the data structure until the output data 516 is determined.

For example, a first computer vision component 510a may process image data 504 to produce first output data, while a second computer vision component 510b may process the image data 504 and the first output data to produce second output data. When the image data is determined 504, therefore, the first computer vision component 510a may begin processing input data (at least because its input dependencies are met) while the second computer vision component 510b may not begin processing data (at least because its input dependencies, namely the first output data of the first computer vision component 510a) are not yet met.

The first computer vision component 510a may thus process the data structure of the computer vision data 512, which includes the image data 504, to determine the first output data. The first computer vision component 510a may then update the data structure to include the first output data (as well as the image data 504). The second computer vision component 510b may then determine that the data structure includes both the image data 504 and the first output data; upon this determination, the second computer vision component 510b may then process the image data 504 and the first output data. The second computer vision component 510b may then, upon completion of its processing, similarly update the data structure to include the second output data.

Other computer vision components 510 may then determine that the data structure includes the image data 504, the first output data, and/or the second output data, and may similarly process the data in the data structure to determine further output data, which may be similarly added to the data structure.

In various embodiments, each computer vision component 510 may periodically poll the computer vision data 512 to determine if the data structure contained therein includes the input data corresponding to that computer vision component 510. A computer vision component 510 may poll the computer vision data 512, for example, every microsecond or millisecond. Instead or in addition, when one computer vision component 510 determines output data and adds the output data to the data structure, it may send a notification to one or more other computer vision components 510; upon receipt of this notification, each other computer vision component 510 may determine if the updated data structure includes inputs that correspond to that computer vision component 510 (and, if so, begin processing the data in the data structure). In other embodiments, when one computer vision component 510 adds output data to the data structure, it sends a notification to the computer vision component configurator 506, which may then send one or more further notifications to one or more other computer vision components 510 to begin processing data in the data structure.

FIG. 5B illustrates an computer vision component 510a processing input computer vision data 512a to determine output computer vision data 512b. As mentioned above, the computer vision data 512a may include image data 514a. The computer vision data 512a may further include time data 514d that represents a time associated with the image data 514a. This time may correspond to a time of capture of data by a camera 212, a time of arrival of the image data 514a at the computer vision components 508, or other time. The time data 514d may be an absolute time expressed in, for example, hours, minutes, seconds or a relative time expressed in, for example, a number of seconds that have elapsed from a reference time. The time data 514d may instead or in addition represent a frame index of the image data 514a. That is, the camera 212 may determine image data 514a comprising a number of frames of video data, wherein a frame is captured every (for example) 10 milliseconds.

The computer vision data 514a may further include sensor data 514e. As described herein (and, in particular, with reference to FIG. 11D), the device 110 may include one or more sensors 1154, such as an infrared sensor 1164 and a location sensor 1169. The computer vision components 510 may process this sensor data 514e in addition to the image data 514a and/or data output by the computer vision components 510.

In various embodiments, the various sensors 1154 may process environmental inputs and produce corresponding outputs with different input-to-output latencies. For example, the infrared sensor 1164 may detect an amount of infrared radiation in the environment and produce corresponding infrared data with a first latency (e.g., 1 millisecond), while a camera 212 may detect an amount of visible light in the environment and produce corresponding image data 504 with a second, different latency (e.g., 10 milliseconds). The computer vision component configurator 506 may thus synchronize the sensor data 514e with the image data 514a such that a time of capture of the sensor data 514e corresponds to a time of capture of the image data 504. The computer vision component configurator 506 may, for example, determine the latency of each sensor 1154 and delay sensor data 514e therefrom by an amount corresponding to the latency.

Thus, the computer vision component 510n of FIG. 5B may process the image data 514a, time data 514d, and/or sensor data 514e. The computer vision component 510a may instead or in addition process data 514f produced by one or more other computer vision components 1-N-1. Upon completion of the processing, the computer vision component 510a may update the data structure of the computer vision data 512b to include the computer vision component data 514g.

Figure 6A:
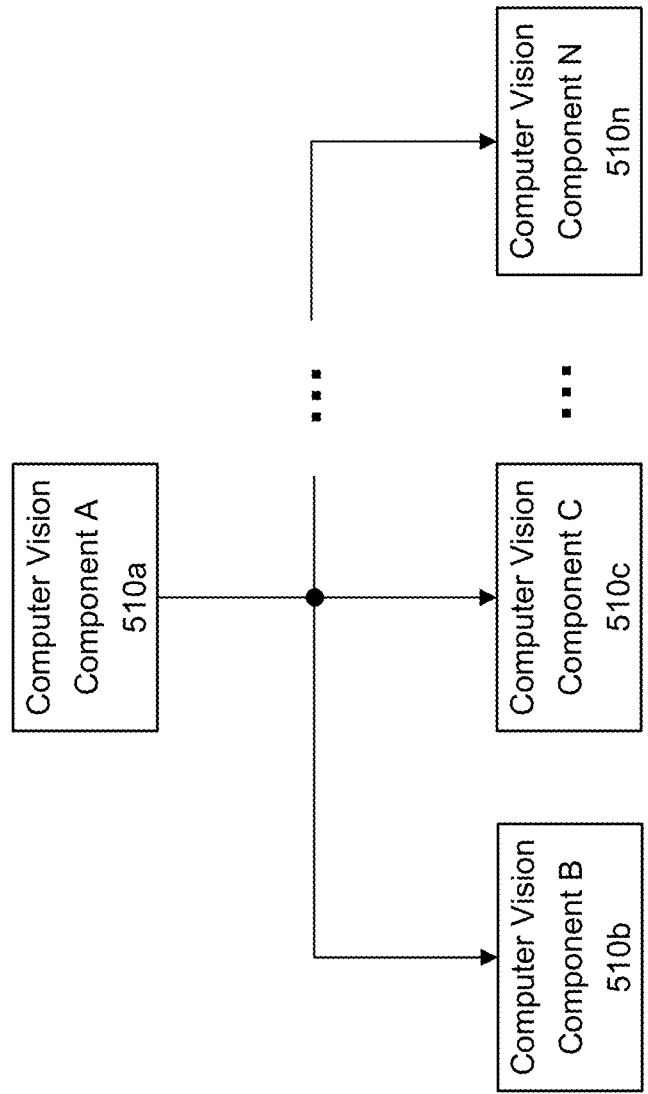

FIGS. 6A, 6B, and 6C illustrate exemplary dependencies between computer vision components 510 according to embodiments of the present disclosure. Referring first to FIG. 6A, as described herein, a first computer vision component 510a may produce output data that is in turn processed by one or more other computer vision components 510b . . . 510n. The other computer vision components 510b . . . 510n may begin processing the output data when, for example, the first computer vision component 510a writes the output data to the data structure as described above. As illustrated, the other computer vision components 510b . . . 510n may begin processing in parallel; as explained in greater detail with reference to FIGS. 7A-7C, however, constraints of the device 110 may require that some of the other computer vision components 510b . . . 510n are first processed while other of the other computer vision components 510b . . . 510n are later processed.

FIG. 6B similarly shows that an computer vision component 510m may process data output by one or more other computer vision components 510a . . . 510n. In some embodiments, all of the other computer vision components 510a . . . 510n process data in parallel, and the outputs of the other computer vision components 510a . . . 510n are available for processing at or near the same time. In other embodiments, one or more of the other computer vision components 510a . . . 510n produce outputs at a time later than that of production of outputs by other computer vision components 510a . . . 510n. The computer vision component 510m may thus begin processing data when the last of the other computer vision components 510a . . . 510n produces output data.

As shown in FIG. 6C, in some embodiments, data processed by the computer vision component 510m may be output by other computer vision components 510a . . . 510n that have additional dependencies. For example, a second computer vision component 510b may process data produced by a first computer vision component 510a. Thus, while an output of the first computer vision component 510a may be available for processing by the computer vision component 510m at a first time, an output of the second computer vision component 510b may be available for processing by the computer vision component 510m at a second time later than that of the first time. The computer vision component 510m may thus process data when the last of the other computer vision components 510a . . . 510n outputs data.

Figure 7A:
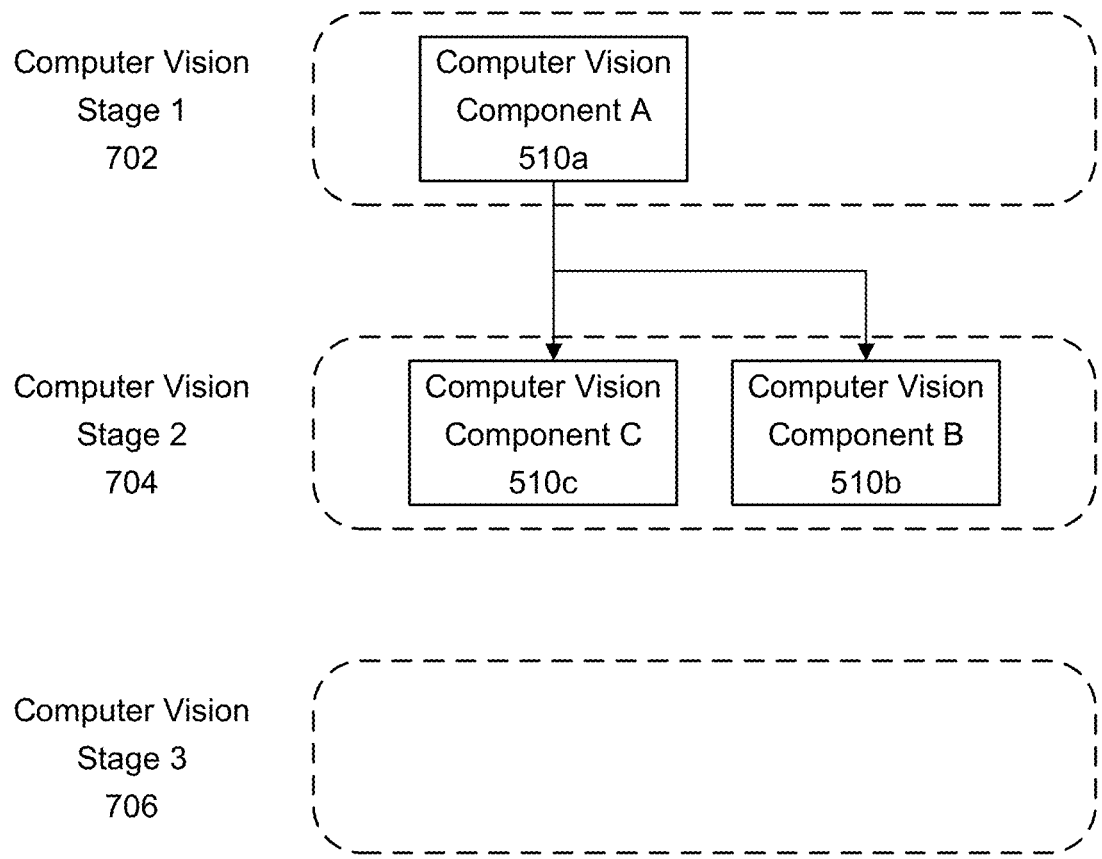
FIGS. 7A and 7B illustrate processing stages of computer vision components according to embodiments of the present disclosure.
Figure 7B:
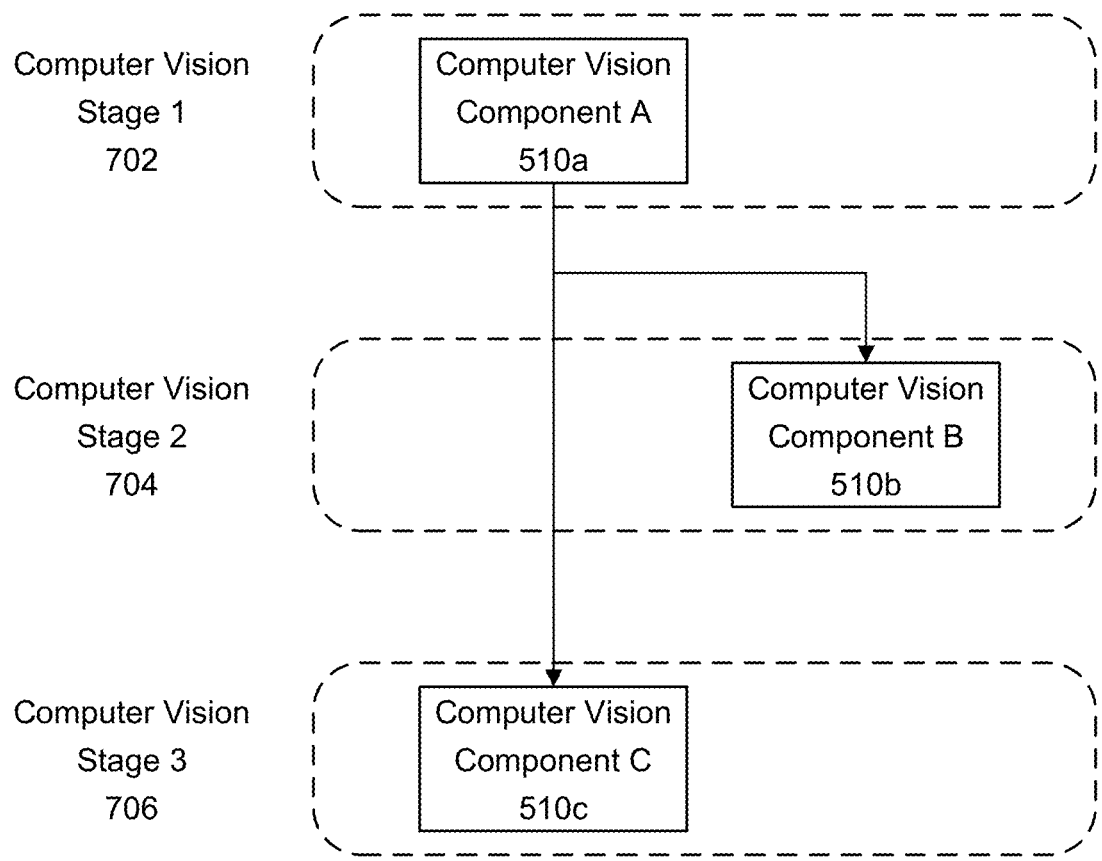

FIGS. 7A and 7B illustrate processing stages of computer vision components 510 according to embodiments of the present disclosure. Referring first to FIG. 7A, a first computer vision component 510a produces, during a first computer vision state 702, first output data, and second and third computer vision components 510b, 510c process the output data during a second computer vision stage 704. As illustrated, the second and third computer vision components 510b may process the data substantially in parallel (that is, during time periods that overlap at least in part).

In various embodiments, however, the computing resources of the device 110 may not permit the second and third computer vision components 510b to process data substantially in parallel. The device 110 may include one or more processing elements, such as one or more central-processing units (CPUs), one or more graphical-processing units (GPUs), and/or one or more digital-signal processors (DSPs). A given processing element may be optimized to perform particular operations; a GPU, for example, may be optimized to perform matrix multiplication operations faster than, for example, a CPU can perform them. A DSP, as another example, may be optimized to perform fast Fourier transforms (FFTs) faster than either a CPU or a GPU. Other processing elements may be incapable of performing other operations; a DSP, for example, may not be able to perform matrix multiplication operations.

A given computer vision component 510 may thus require the use of one or more particular processing elements (e.g., it may be incapable of using other processing elements to process data) and/or may run quickly when using a first processing element and slowly when using a first processing element. If, for example, both the second and third computer vision components 510b, 510c require the same processing element, and if that processing element is not capable of allowing the second and third computer vision components 510b, 510c to process data in parallel, one of the second and third computer vision components 510b, 510c may first process data using the processing element during a first time period, and the other of the second and third computer vision components 510b, 510c may process data using the processing element during a second time period after the first time period.

FIG. 7B illustrates an example in which operation of the second and third computer vision components 510b, 510c may be affect by availability of one or more processing elements. For example, both of the second and third computer vision components 510b, 510c may require use of the same processing element (e.g., a DSP). In some embodiments, therefore the second computer vision component 510b may process the output data during a second computer vision stage 704, while the third computer vision component 510c may process the output data during a third computer vision stage 706.

Figure 8A:
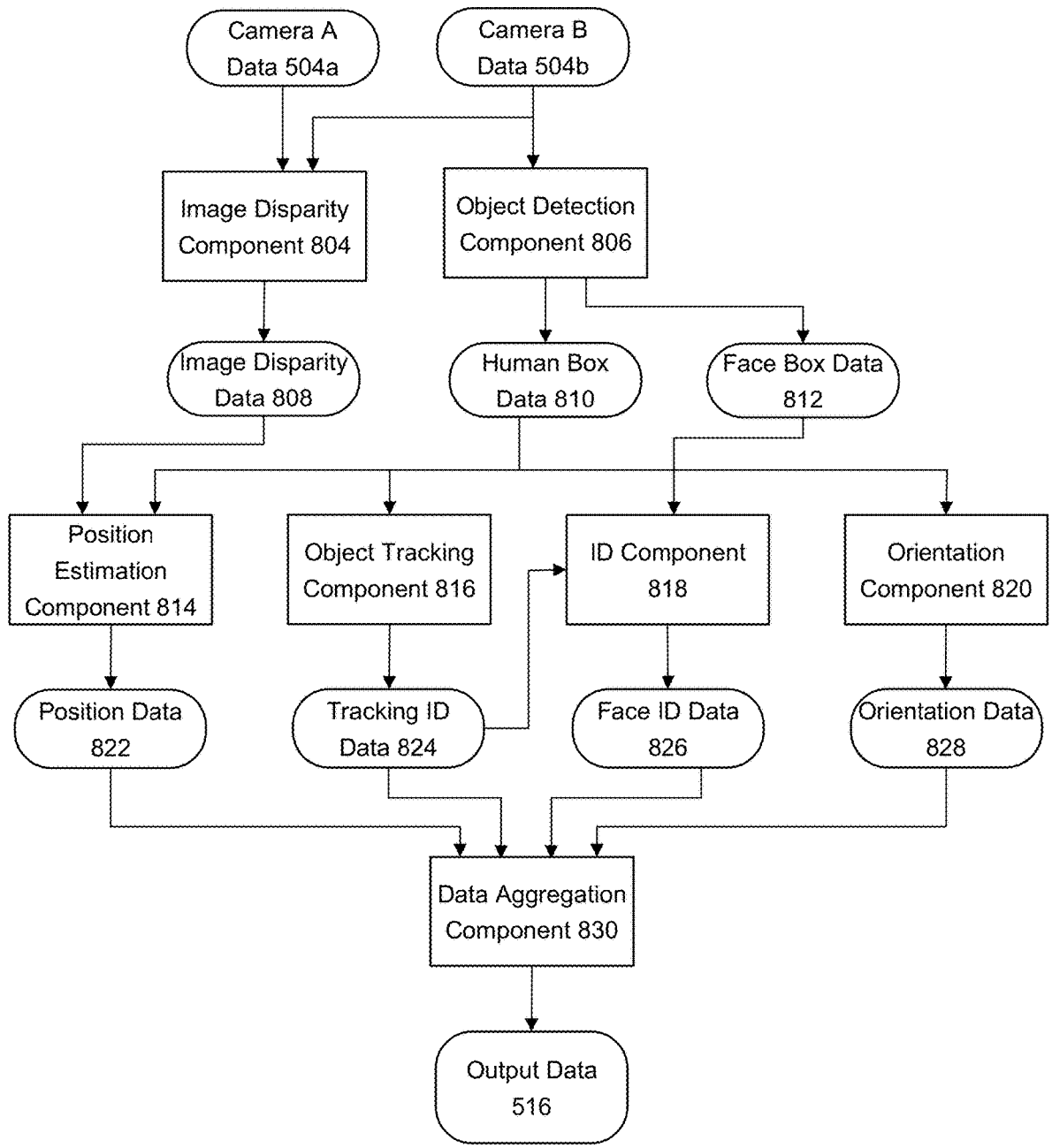
FIGS. 8A and 8B illustrate components for computer vision and image processing by an autonomously motile device according to embodiments of the present disclosure.
Figure 8B:
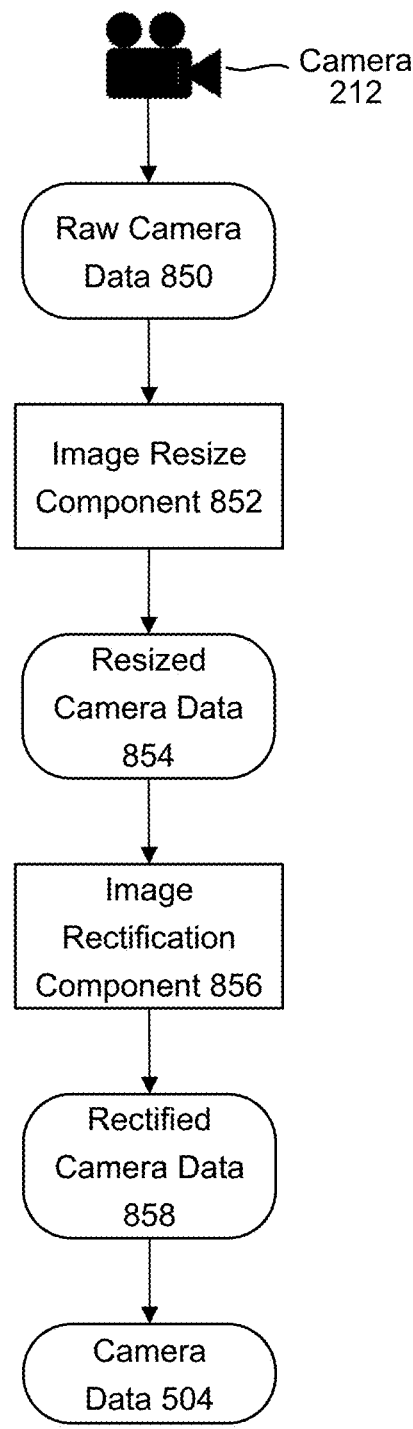

FIGS. 8A and 8B illustrate components for computer vision by an autonomously motile device according to embodiments of the present disclosure. The computer vision components of FIG. 8A illustrate a particular instance of the computer vision components 510 of FIG. 5A; the present disclosure is, however, not limited to only these components and/or to only this arrangement of components.

In various embodiments, the device 110 includes two cameras 212a and 212b that determine corresponding camera data 504a and 504b. As described herein, some of the computer vision components process data from both cameras 212a, 212b, while other of the computer vision components process data from only one camera 212.

For example, an image-disparity component 804 may process data 504a, 504b from both cameras 212a, 212b to determine differences therein. As illustrated in, for example, FIG. 4A, due to the horizontal distance between the cameras 212a, 212b, each of the image data 504a, 504b may include different representations of object in the environment 302, such as the television 406. In particular, an object in the environment may be represented at a first position in the image data 504a and at a second, different position in the image data 504b. This difference in position may correspond to a horizontal shift in position. Objects closer to the device 110 may exhibit a larger shift in position, while object farther from the device 110 may exhibit a smaller shift in position.

The image-disparity component 804 may thus identify similar objects in each of the image data 504a, 504b by, for example, determining outlines of objects in the image data 504a, 504b and matching a first outline in the first image data 504a with a corresponding outline in the second image data 504b and then determining the amount of horizontal shift between the objects. The image-disparity component 804 may thus output image-disparity data 808, which may be an (x,y) grid corresponding to an (x,y) dimension of the image data in which each element of the grid represents an amount of horizontal shift between any object represented at that point in the grid. The image disparity data 808 may thus be or include a disparity map corresponding to the image data 504a, 504b.

An object detection component 806 may process data from a single camera 212 to determine bounding box data 810 (for example a bounding box surrounding a detected body) and/or bounding box data 812 (for example a bounding box surrounding a detected face). For example, as illustrated in FIG. 4C, the device may determine bounding boxes 410 corresponding to detected bodies and bounding boxes 412 corresponding to detected faces. The bounding boxes may correspond to respective bounding box data, e.g., bounding box data 810 (which may correspond to a body/bounding box 410) and/or bounding box data 812 (which may correspond to a face/bounding box 412). For example the bounding box data 810 and/or bounding box data 812 may be a rectangle 410, 412 or other shape that circumscribes a representation of human and face, respectively, represented in the image data 504. Other objects besides bodies or faces may also be detected and associated with corresponding bounding boxes/bounding box data. The object detection component 806 may be or include a trained model, such as a neural network model, that processes the camera data 504 to determine the bounding box data 810 and/or bounding box data 812. The trained model (as well as the other trained models described herein) may include one or more neural-network elements arranged in one or more layers. The neural network may be or include a deep neural network (DNN), convolutional neural network (CNN), and/or recurrent neural network (RNN). The neural network may be trained using appropriate training data; in this example, the training data may include, as input, a number of images that include humans and/or faces and a number of corresponding output or target data, such as annotations corresponding to bounding boxes. The neural network may be trained to estimate the target data using, for example, a gradient descent algorithm. The object detection component 806 may include a single neural network that determines both the bounding box data 810 and/or bounding box data 812 and/or different neural networks or other trained components configured to detect different objects. For example, the object detection component 806 may include a first neural network that determines the bounding box data 810 corresponding to bodies and a second neural network that determines the bounding box data 812 corresponding to faces.

A position estimation component 814 may process the image disparity data 808 and the bounding box data 810 to determine position data 822; the position data 822 may be, for each human represented in the bounding box data 810, an estimate of the position of the human in the environment 302 relative to the device 110. For example, the position estimation component 814 may determine the position of the representation of the human in the image data as represented in the bounding box data 810 and then determine the corresponding (x,y) disparity values in the image disparity data 808. Based on those values, the position estimation component 814 may determine the estimate of the position.

Figure 9A:
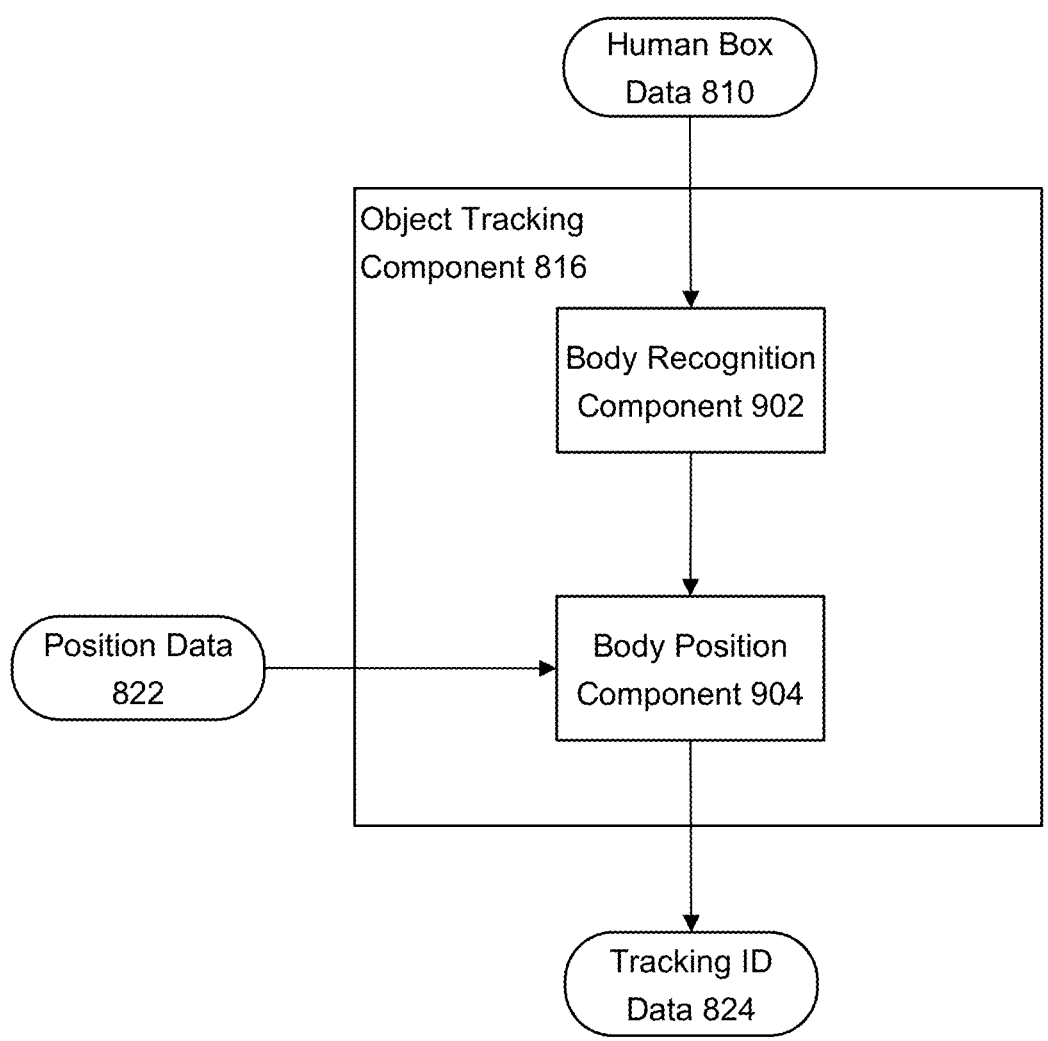
FIGS. 9A and 9B illustrate details of components for computer vision by an autonomously motile device according to embodiments of the present disclosure.

An object tracking component 816, described in greater detail in FIG. 9A, may process the bounding box data 810 to determine tracking identifier data 824 that uniquely identifies a human in the environment. The tracking identifier data 824 may distinguish between humans in the environment 302 but may not necessarily associate a human with a particular identity, such as the name of the human. For example, the tracking identifier data 824 may identify a human as "Person A" or "Person B," but not as "Robert Smith." Thus, the object tracking component 816 may identify a human even if, for example, a face associated with the human is not visible to the device 110 and/or if the human is not a user of the device 110 and/or is not enrolled with the device 110.

An identification (ID) component 818 may identify a face represented in the bounding box data 812 as associated with a particular user of the device 110. A user 102 of the device 110 may enroll with the device 110 by allowing the device 110 to capture one or more images of the face of the user 102 and thereafter associate the images with a user account of the user 102. The ID component 818 may thereafter compare the bounding box data 812 with the one or more previously captured images to thereby identify the user 102 and/or the user account. The ID component 818 is explained in greater detail with reference to FIG. 9B. If a face is recognized the device 110 may associate the identifier of the face with a body associated with the face (for example, by associating a face identifier with a body identifier) so that should the user turn away from the device 110 thus preventing the device 110 from recognizing the face (while still being able to recognize the body) in later image data, the device 110 may still identify the user by relying on the association with the face to the body.

An orientation component 820 may also process the bounding box data 810 to determine orientation data 828. The human-orientation component 820 may also be a trained model; this model may be trained using, as training data, images of humans in various orientations and annotation data describing the orientations. The orientation data 828 may include one or more values representing the orientation of the human, such as 1 for "facing device" and 0 for "not facing device." The orientation data 828 may instead or in addition include a value representing a rotation of the human relative to the device 110, such as 0° for "directly facing device" and 1800 for "directly facing away from device." Any type or format for the orientation data 828 is within the scope of the present disclosure. If the orientation data indicates that the user is facing away from the device 110 the device 110 may determine to not perform an attempt at detecting a face in image data and may rely instead on detecting a body in in the image data for purposes of detecting and/or identifying a user.

A data aggregation component 830 may receive the various outputs from other components, such as the position data 822, the tracking identifier data 824, the face identifier data 826, and/or the orientation data 828, and produce corresponding output data 516. The data aggregation component 830 may thus wait until each of the preceding components has completed processing and produced its output data and determine the output data 516 only when each is complete.

Referring to FIG. 8B, in some embodiments, data from the camera 212 may be preprocessed by one or more image processing components (such as those shown in FIG. 8B) prior to its processing by the computer-vision components described herein. For example, in some embodiments, an image-resize component 852 may process raw camera data 850 having a first size (e.g., 1920×1080 pixels) to determine resized camera data 854 having a second size different from that of the first size (e.g., 1024×768 pixels). The cameras 212 may, for example, also be used to provide data to other systems, such as navigation systems, that require higher-resolution image data, while the computer-vision components described herein may not require the same high-resolution image data. The image-resize component 852 may thus reduce the size of the raw camera data 850 to increase the processing speed of the computer-vision components. The image may be resized by, for example, computing an average value of two adjacent pixels in the raw camera data 850 and using the average value as a single pixel in the resized camera data 854.

An image-rectification component 856 may process the camera data instead of, or in addition to, the processing of the image-resize component 852. The determined rectified camera data 858 may thus be used as the camera data 504 for processing by the computer vision components described herein. The image-rectification component 856 may compensate for any distortions caused by a lens of the camera 212; these distortions may be caused by a property of the lens (e.g., a fish-eye lens may distort image data to include a greater field of view) and/or manufacturing defects of the lens. In various embodiments, the image-rectification component 856 determines or receives data describing the location and amount of distortion present in the camera data 850 and processed the camera data 850 in accordance with this distortion data. For example, the distortion data may be an (x,y) grid of vectors having a dimension equal to that of the image data 850; each vector may represent a Ax, Ay shift to be applied to a corresponding pixel in the camera data 850.

Figure 9B:
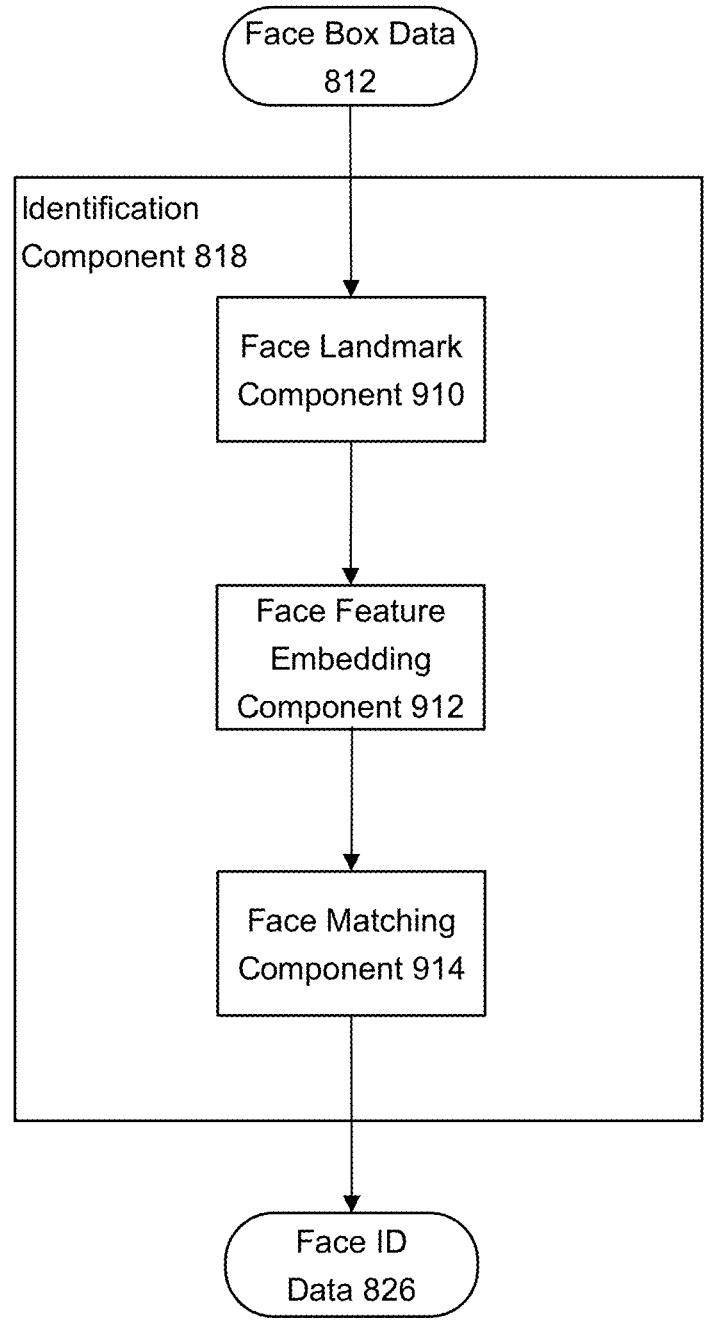

FIGS. 9A and 9B illustrate details of components for computer vision by an autonomously motile device according to embodiments of the present disclosure. Referring first to FIG. 9A, the object tracking component 816 may include a body-recognition component 902 and a body position component 904. The body-recognition component 902 may be a trained model and may process the bounding box data 810 to determine a corresponding embedding. For example, the body-recognition component 902 may be or include an encoder that processes the bounding box data 810 with one or more neural-network layers, such as CNN layers, to extract features from the bounding box data 810 and to output a vector representing the features. Examples of features may include height, weight, body shape, leg length, arm length, or other such features. Embeddings determined for a first person over a period of time may be similar, even if the person changes appearance by, for example, changing clothing, while embeddings determined for a second person may differ from that of the embeddings determined for the first person.

The body position component 904 may process the embedding as well as the position data 822 to determine the tracking identifier data 824. In other words, the position data 822 may represent that an unidentified human is disposed at an (x,y) position, while the embedding may identify that person as "Person A." The body position component 904 may thus combine this information such that the tracking identifier data 824 represents that "Person A" is disposed at the (x,y) position.

Referring to FIG. 9B, the ID component 818 may include a face-landmark component 910, a face-feature embedding component 912, and a face-matching component 914. The face-landmark component 910 may be a trained model and may process the bounding box data 812 to output (x,y) coordinates of one or more features of the face, such as coordinates of eyes, nose, mouth, ears, cheekbones, chin, etc. The face-feature embedding component 912, like the body-recognition component 902, may be a trained model such as an encoder, and may process the coordinates of the features and/or corresponding bounding box data 812 to determine embedding data corresponding to the features. The face-matching component 914 may compare the embedding to one or more predetermined embeddings; if the embedding matches a predetermined embedding, the face-matching component 914 may include, in the face identifier data 826, information from a user account associated with the predetermined embedding identifying the user. The predetermined embedding may be determined during, for example, a face enrollment process.

Figure 10A:
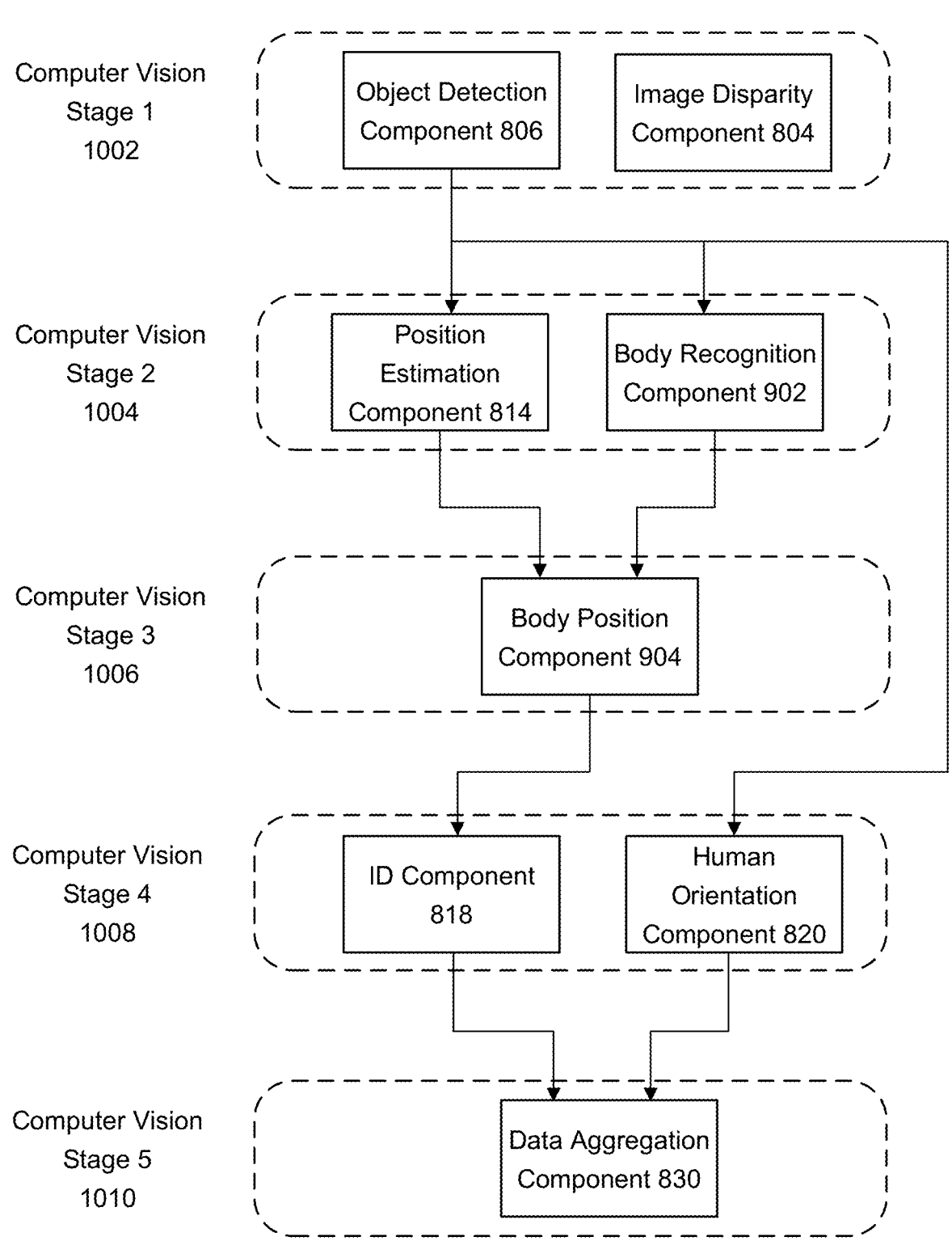
FIGS. 10A and 10B illustrate processing stages of computer vision components according to embodiments of the present disclosure.
Figure 10B:
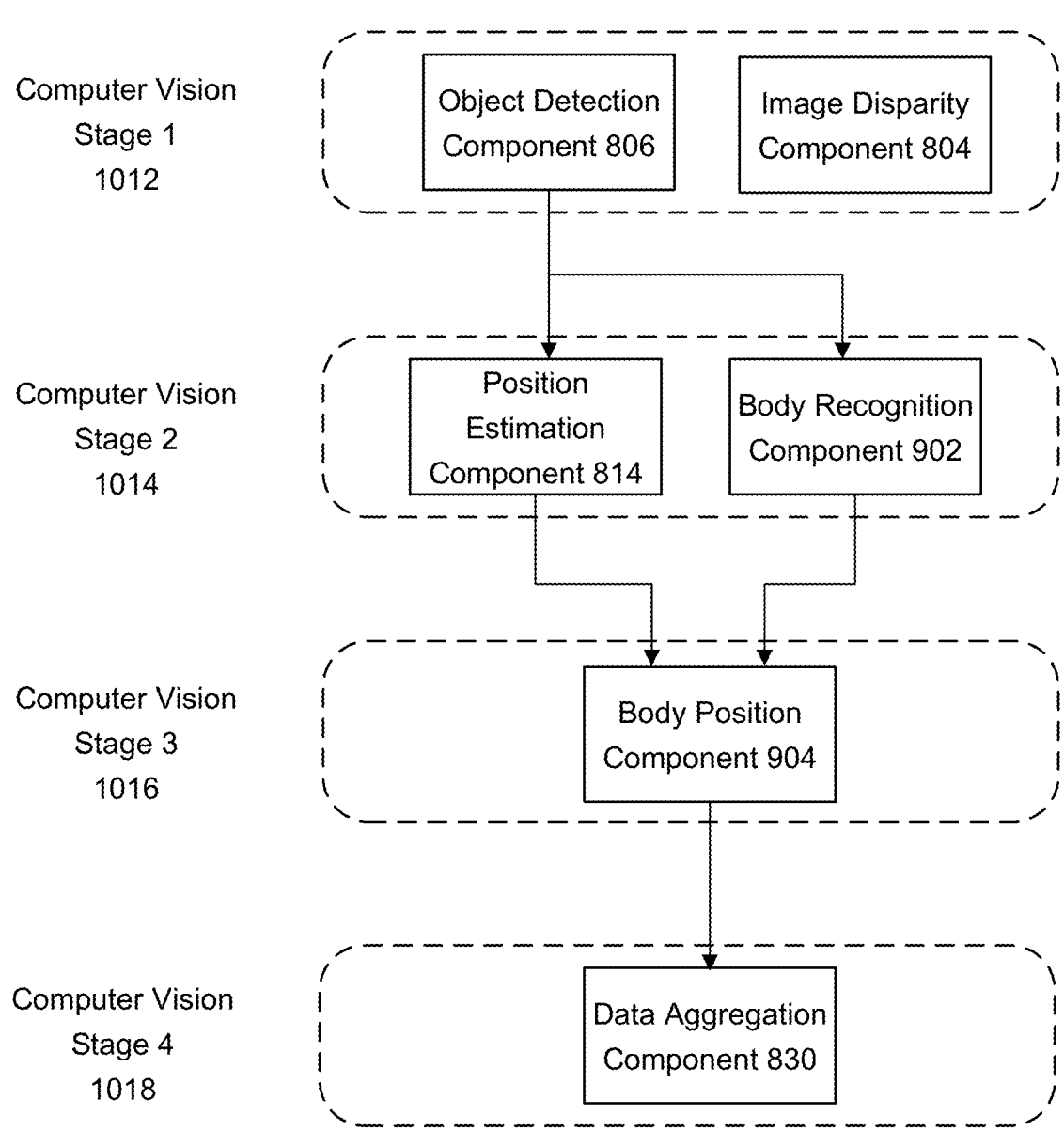

FIGS. 10A and 10B illustrate processing stages of computer vision components according to embodiments of the present disclosure. FIG. 10A illustrates image-processing components that include an ID component 818, which may be used when the command data 502 includes a command that corresponds to identifying a user. FIG. 10B illustrates computer vision components that do not include an ID component 818.

Referring first to FIG. 10A, a first computer vision stage 1002 may include processing by the object detection component 806 and the image-disparity component 804. A second computer vision stage 1004 may include processing by the position-estimation component 814 and the body-recognition component 902. A third computer vision stage 1006 may include processing by the body-position component 904. A fourth computer vision stage 1008 may include processing by the ID component 818 and the human-orientation component 920. A fifth processing stage 1010 may include processing by the data aggregation component 830.

Referring to FIG. 10B, a first computer vision stage 1012 may include processing by the object detection component 806 and the image-disparity component 804. A second computer vision stage 1014 may include processing by the position-estimation component 814 and the body-recognition component 902. A third computer vision stage 1016 may include processing by the body-position component 904. A fourth computer vision stage 1018 may include processing by the data aggregation component 830.

Figure 12:
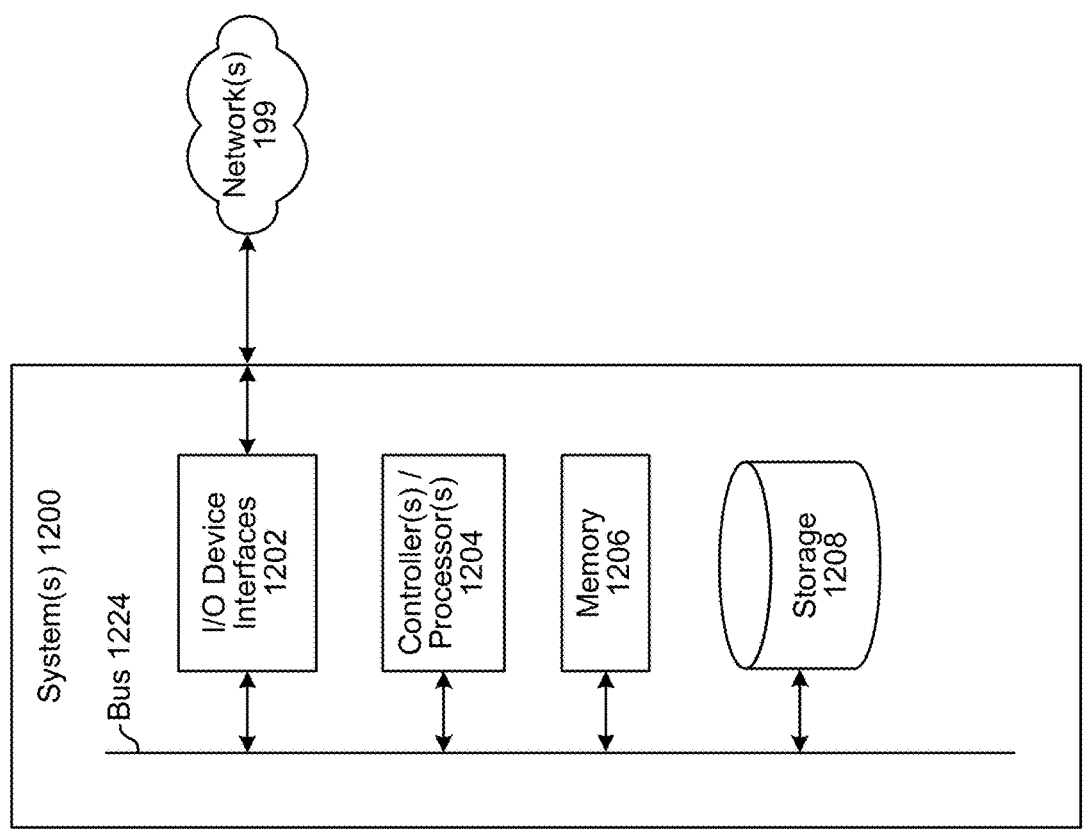
FIG. 12 illustrates a block diagram of a server according to embodiments of the present disclosure.

FIG. 11A is a block diagram conceptually illustrating an autonomously motile device 110 or user device in accordance with the present disclosure. FIG. 12 is a block diagram conceptually illustrating example components of a system 1200, such as remote server, which may assist with creating a map of an environment 302, ASR processing, NLU processing, etc. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system 1200 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers may be included in the system 1200, such as one or more servers for performing ASR processing, one or more servers for performing NLU processing, one or more skill system(s) for performing actions responsive to user inputs, etc. In operation, each of these devices (or groups of devices) may include computer-readable and computer-executable instructions that reside on the respective server.

FIG. 11A is a block diagram of some components of the autonomously motile device 110 such as network interfaces 1119, sensors 1154, and output devices, according to some implementations. The components illustrated here are provided by way of illustration and not necessarily as a limitation. For example, the autonomously motile device 110 may utilize a subset of the particular network interfaces 1119, output devices, or sensors 1154 depicted here, or may utilize components not pictured. One or more of the sensors 1154, output devices, or a combination thereof may be included on a moveable component that may be panned, tilted, rotated, or any combination thereof with respect to a chassis of the autonomously motile device 110.

The autonomously motile device 110 may include input/output device interfaces 1102 that connect to a variety of components such as an audio output component such as a speaker 1112, a wired headset or a wireless headset (not illustrated), or other component capable of outputting audio. The autonomously motile device 110 may also include an audio capture component. The audio capture component may be, for example, a microphone 1120 or array of microphones, a wired headset or a wireless headset, etc. If an array of microphones is included, approximate distance to a sound's point of origin may be determined by acoustic localization based on time and amplitude differences between sounds captured by different microphones of the array. The autonomously motile device 110 may additionally include a display 214 for displaying content. The autonomously motile device 110 may further include a camera 212, light, button, actuator, and/or sensor 1154.

The network interfaces 1119 may include one or more of a WLAN interface, PAN interface, secondary radio frequency (RF) link interface, or other interface. The WLAN interface may be compliant with at least a portion of the Wi-Fi specification. For example, the WLAN interface may be compliant with at least a portion of the IEEE 802.11 specification as promulgated by the Institute of Electrical and Electronics Engineers (IEEE). The PAN interface may be compliant with at least a portion of one or more of the Bluetooth, wireless USB, Z-Wave, ZigBee, or other standards. For example, the PAN interface may be compliant with the Bluetooth Low Energy (BLE) specification.

The secondary RF link interface may comprise a radio transmitter and receiver that operate at frequencies different from or using modulation different from the other interfaces. For example, the WLAN interface may utilize frequencies in the 2.4 GHz and 5 GHz Industrial Scientific and Medicine (ISM) bands, while the PAN interface may utilize the 2.4 GHz ISM bands. The secondary RF link interface may comprise a radio transmitter that operates in the 900 MHz ISM band, within a licensed band at another frequency, and so forth. The secondary RF link interface may be utilized to provide backup communication between the autonomously motile device 110 and other devices in the event that communication fails using one or more of the WLAN interface or the PAN interface. For example, in the event the autonomously motile device 110 travels to an area within the environment 302 that does not have Wi-Fi coverage, the autonomously motile device 110 may use the secondary RF link interface to communicate with another device such as a specialized access point, docking station, or other autonomously motile device 110.

The other network interfaces may include other equipment to send or receive data using other wavelengths or phenomena. For example, the other network interface may include an ultrasonic transceiver used to send data as ultrasonic sounds, a visible light system that communicates by modulating a visible light source such as a light-emitting diode, and so forth. In another example, the other network interface may comprise a wireless wide area network (WWAN) interface or a wireless cellular data network interface. Continuing the example, the other network interface may be compliant with at least a portion of the 3G, 4G, Long Term Evolution (LTE), 5G, or other standards. The I/O device interface (1102/1202) may also include and/or communicate with communication components (such as network interface(s) 1119) that allow data to be exchanged between devices such as different physical servers in a collection of servers or other components.

The components of the device(s) 110 and/or the system(s) 1200 may include their own dedicated processors, memory, and/or storage. Alternatively, one or more of the components of the device(s) 110 and/or the system(s) 1200 may utilize the I/O interfaces (1102/1202), processor(s) (1104/1204), memory (1106/1206), and/or storage (1108/1208) of the device(s) 110 and/or the system(s) 1200, respectively.

FIG. 11B illustrates components that may be stored in a memory of an autonomously motile device according to embodiments of the present disclosure. Although illustrated as included in memory 1106, the components (or portions thereof) may also be included in hardware and/or firmware. FIG. 11C illustrates data that may be stored in a storage of an autonomously motile device according to embodiments of the present disclosure. Although illustrated as stored in storage 1108, the data may be stored in memory 1106 or in another component. FIG. 11D illustrates sensors that may be included as part of an autonomously motile device according to embodiments of the present disclosure.

A position determination component 1132 determines position data 1144 indicative of a position 306 of the feature 404 in the environment 302. In one implementation the position 306 may be expressed as a set of coordinates with respect to the first camera 212a. The position determination component 1132 may use a direct linear transformation triangulation process to determine the position 306 of a feature 404 in the environment 302 based on the difference in apparent location of that feature 404 in two images acquired by two cameras 212 separated by a known distance.

A movement determination module 1133 determines if the feature 404 is stationary or non-stationary. First position data 1144a indicative of a first position 306a of a feature 404 depicted in the first pair of images 402a acquired at time $t_1$ is determined by the position determination component 1132. Second position data 1144b of the same feature 404 indicative of a second position 306b of the same feature 404 as depicted in the second pair of images 402b acquired at time $t_2$ is determined as well. Similar determinations made for data relative to first position 306a and second position 306b may also be made for third position 306c, and so forth.

The movement determination module 1133 may use inertial data from the IMU 1180 or other sensors that provides information about how the autonomously motile device 110 moved between time $t_1$ and time $t_2$. The inertial data and the first position data 1144a is used to provide a predicted position of the feature 404 at the second time. The predicted position is compared to the second position data 1144b to determine if the feature is stationary or non-stationary. If the predicted position is less than a threshold value from the second position 306b in the second position data 1144b, then the feature 404 is deemed to be stationary.

Features 404 that have been deemed to be stationary may be included in the second feature data. The second feature data may thus exclude non-stationary features 404 and comprise a subset of the first feature data 1148 which comprises stationary features 404.

The second feature data may be used by a simultaneous localization and mapping (SLAM) component 1134. The SLAM component 1134 may use second feature data to determine pose data 1145 that is indicative of a location of the autonomously motile device 110 at a given time based on the appearance of features 404 in pairs of images 402. The SLAM component 1134 may also provide trajectory data indicative of the trajectory 304 that is based on a time series of pose data 1145 from the SLAM component 1134.

Other information, such as depth data from a depth sensor, the position data 1144 associated with the features 404 in the second feature data, and so forth, may be used to determine the presence of obstacles 308 in the environment 302 as represented by an occupancy map as represented by occupancy map data 1149.

The occupancy map data 1149 may comprise data that indicates the location of one or more obstacles 308, such as a table, wall, stairwell, and so forth. In some implementations, the occupancy map data 1149 may comprise a plurality of cells with each cell of the plurality of cells representing a particular area in the environment 302. Data, such as occupancy values, may be stored that indicates whether an area of the environment 302 associated with the cell is unobserved, occupied by an obstacle 308, or is unoccupied. An obstacle 308 may comprise an object or feature that prevents or impairs traversal by the autonomously motile device 110. For example, an obstacle 308 may comprise a wall, stairwell, and so forth.

The occupancy map data 1149 may be manually or automatically determined. For example, during a learning phase the user may take the autonomously motile device 110 on a tour of the environment 302, allowing the mapping component 1130 of the autonomously motile device 110 to determine the occupancy map data 1149. The user may provide input data such as tags designating a particular obstacle type, such as "furniture" or "fragile". In another example, during subsequent operation, the autonomously motile device 110 may generate the occupancy map data 1149 that is indicative of locations and types of obstacles such as chairs, doors, stairwells, and so forth as it moves unattended through the environment 302.

Modules described herein, such as the mapping component 1130, may provide various processing functions such as de-noising, filtering, and so forth. Processing of sensor data 514e, such as image data from a camera 212, may be performed by a module implementing, at least in part, one or more of the following tools or techniques. In one implementation, processing of image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 514e. In still another implementation, functions such as those in the Machine Vision Toolbox (MVTB) available using MATLAB as developed by MathWorks, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 514e or other data. For example, the ANN may be trained using a supervised learning algorithm such that object identifiers are associated with images of particular objects within training images provided to the ANN. Once trained, the ANN may be provided with the sensor data 514e and produce output indicative of the object identifier.

A navigation map component 1135 uses the occupancy map data 1149 as input to generate a navigation map as represented by navigation map data 1150. For example, the navigation map component 1135 may produce the navigation map data 1150 by inflating or enlarging the apparent size of obstacles 308 as indicated by the occupancy map data 1149.

An autonomous navigation component 1136 provides the autonomously motile device 110 with the ability to navigate within the environment 302 without real-time human interaction. The autonomous navigation component 1136 may implement, or operate in conjunction with, the mapping component 1130 to determine one or more of the occupancy map data 1149, the navigation map data 1150, or other representations of the environment 302.

The autonomously motile device 110 autonomous navigation component 1136 may generate path plan data 1152 that is indicative of a path through the environment 302 from the current location to a destination location. The autonomously motile device 110 may then begin moving along the path.

While moving along the path, the autonomously motile device 110 may assess the environment 302 and update or change the path as appropriate. For example, if an obstacle 308 appears in the path, the mapping component 1130 may determine the presence of the obstacle 308 as represented in the occupancy map data 1149 and navigation map data 1150. The now updated navigation map data 1150 may then be used to plan an alternative path to the destination location.

The autonomously motile device 110 may utilize one or more task components 1141. The task component 1141 comprises instructions that, when executed, provide one or more functions. The task components 1141 may perform functions such as finding a user, following a user, present output on output devices of the autonomously motile device 110, perform sentry tasks by moving the autonomously motile device 110 through the environment 302 to determine the presence of unauthorized people, and so forth.

The autonomously motile device 110 includes one or more output devices, such as one or more of a motor, light, speaker, display, projector, printer, and so forth. One or more output devices may be used to provide output during operation of the autonomously motile device 110.

The autonomously motile device 110 may use the network interfaces 1119 to connect to a network 199. For example, the network 199 may comprise a wireless local area network, that in turn is connected to a wide area network such as the Internet.

The autonomously motile device 110 may be configured to dock or connect to a docking station. The docking station may also be connected to the network 199. For example, the docking station may be configured to connect to the wireless local area network 199 such that the docking station and the autonomously motile device 110 may communicate. The docking station may provide external power which the autonomously motile device 110 may use to charge a battery of the autonomously motile device 110.

The autonomously motile device 110 may access one or more servers 1200 via the network 199. For example, the autonomously motile device 110 may utilize a wakeword detection component to determine if the user is addressing a request to the autonomously motile device 110. The wakeword detection component may hear a specified word or phrase and transition the autonomously motile device 110 or portion thereof to the wake operating mode. Once in the wake operating mode, the autonomously motile device 110 may then transfer at least a portion of the audio spoken by the user to one or more servers 1200 for further processing. The servers 1200 may process the spoken audio and return to the autonomously motile device 110 data that may be subsequently used to operate the autonomously motile device 110.

The autonomously motile device 110 may also communicate with other devices. The other devices may include one or more devices that are within the physical space such as a home or associated with operation of one or more devices in the physical space. For example, the other devices may include a doorbell camera, a garage door opener, a refrigerator, washing machine, and so forth.

In other implementations, other types of autonomous motile devices 110 may use the systems and techniques described herein. For example, the autonomously motile device 110 may comprise an autonomous ground vehicle that is moving on a street, an autonomous aerial vehicle in the air, autonomous marine vehicle, and so forth.

The autonomously motile device 110 may include one or more batteries (not shown) to provide electrical power suitable for operating the components in the autonomously motile device 110. In some implementations other devices may be used to provide electrical power to the autonomously motile device 110. For example, power may be provided by wireless power transfer, capacitors, fuel cells, storage flywheels, and so forth.

One or more clocks may provide information indicative of date, time, ticks, and so forth. For example, the processor 1104 may use data from the clock to associate a particular time with an action, sensor data 514e, and so forth.

The autonomously motile device 110 may include one or more hardware processors 1104 (processors) configured to execute one or more stored instructions. The processors 1104 may comprise one or more cores. The processors 1104 may include microcontrollers, systems on a chip, field programmable gate arrays, digital signal processors, graphic processing units, general processing units, and so forth.

The autonomously motile device 110 may include one or more communication component 1140 such as input/output (I/O) interfaces 1102, network interfaces 1119, and so forth. The communication component 1140 enable the autonomously motile device 110, or components thereof, to communicate with other devices or components. The communication component 1140 may include one or more I/O interfaces 1102. The I/O interfaces 1102 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1102 may couple to one or more I/O devices. The I/O devices may include input devices such as one or more of a sensor 1154, keyboard, mouse, scanner, and so forth. The I/O devices may also include output devices such as one or more of a motor, light, speaker 1112, display 214, projector, printer, and so forth. In some embodiments, the I/O devices may be physically incorporated with the autonomously motile device 110 or may be externally placed.

The I/O interface(s) 1102 may be configured to provide communications between the autonomously motile device 110 and other devices such as other devices 110, docking stations, routers, access points, and so forth, for example through antenna 1110 and/or other component. The I/O interface(s) 1102 may include devices configured to couple to personal area networks (PANs), local area networks (LANs), wireless local area networks (WLANS), wide area networks (WANs), and so forth. For example, the network interfaces 1119 may include devices compatible with Ethernet, Wi-Fi, Bluetooth, Bluetooth Low Energy, ZigBee, and so forth. The autonomously motile device 110 may also include one or more busses 1124 or other internal communications hardware or software that allow for the transfer of data between the various modules and components of the autonomously motile device 110.

As shown in FIG. 11A, the autonomously motile device 110 includes one or more memories 1106. The memory 1106 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1106 provides storage of computer-readable instructions, data structures, program modules, and other data for the operation of the autonomously motile device 110. A few example functional modules are shown stored in the memory 1106, although the same functionality may alternatively be implemented in hardware, firmware, or as a system on a chip (SoC).

The memory 1106 may include at least one operating system (OS) component 1139. The OS component 1139 is configured to manage hardware resource devices such as the I/O interfaces 1102, the I/O devices, the communication component 1140, and provide various services to applications or modules executing on the processors 1104. The OS component 1139 may implement a variant of the FreeBSD operating system as promulgated by the FreeBSD Project; other UNIX or UNIX-like variants; a variation of the Linux operating system as promulgated by Linus Torvalds; and/or the Windows operating system from Microsoft Corporation of Redmond, Wash.

Also stored in the memory 1106, or elsewhere may be a data store 1108 and one or more of the following modules. These modules may be executed as foreground applications, background tasks, daemons, and so forth. The data store 1108 may use a flat file, database, linked list, tree, executable code, script, or other data structure to store information. In some implementations, the data store 1108 or a portion of the data store 1108 may be distributed across one or more other devices including other devices 110, servers 1200, network attached storage devices, and so forth.

A communication component 1140 may be configured to establish communication with other devices, such as other devices 110, an external server 1200, a docking station, and so forth. The communications may be authenticated, encrypted, and so forth.

Other modules within the memory 1106 may include a safety component 1129, the mapping component 1130, the navigation map component 1135, the autonomous navigation component 1136, the one or more components 1141, a speech processing component 1137, or other components. The components may access data stored within the data store 1108, including safety tolerance data 1146, sensor data 514e, inflation parameters, other data, and so forth.

The safety component 1129 may access the safety tolerance data 1146 to determine within what tolerances the autonomously motile device 110 may operate safely within the environment 302. For example, the safety component 1129 may be configured to stop the autonomously motile device 110 from moving when an extensible mast of the autonomously motile device 110 is extended. In another example, the safety tolerance data 1146 may specify a minimum sound threshold which, when exceeded, stops all movement of the autonomously motile device 110. Continuing this example, detection of sound such as a human yell would stop the autonomously motile device 110. In another example, the safety component 1129 may access safety tolerance data 1146 that specifies a minimum distance from an object that the autonomously motile device 110 is to maintain. Continuing this example, when a sensor 1154 detects an object has approached to less than the minimum distance, all movement of the autonomously motile device 110 may be stopped. Movement of the autonomously motile device 110 may be stopped by one or more of inhibiting operations of one or more of the motors, issuing a command to stop motor operation, disconnecting power from one or more the motors, and so forth. The safety component 1129 may be implemented as hardware, software, or a combination thereof.

The safety component 1129 may control other factors, such as a maximum speed of the autonomously motile device 110 based on information obtained by the sensors 1154, precision and accuracy of the sensor data 514e, and so forth. For example, detection of an object by an optical sensor may include some error, such as when the distance to an object comprises a weighted average between an object and a background. As a result, the maximum speed permitted by the safety component 1129 may be based on one or more factors such as the weight of the autonomously motile device 110, nature of the floor, distance to the object, and so forth. In the event that the maximum permissible speed differs from the maximum speed permitted by the safety component 1129, the lesser speed may be utilized.

The navigation map component 1135 uses the occupancy map data 1149 as input to generate the navigation map data 1150. The navigation map component 1135 may produce the navigation map data 1150 to inflate or enlarge the obstacles 308 indicated by the occupancy map data 1149. One or more inflation parameters may be used during operation. The inflation parameters provide information such as inflation distance, inflation adjustment values, and so forth. In some implementations the inflation parameters may be based at least in part on the sensor field-of-view, sensor blind spot, physical dimensions of the autonomously motile device 110, and so forth.

The speech processing component 1137 may be used to process utterances of the user. Microphones may acquire audio in the presence of the autonomously motile device 110 and may send raw audio data 1143 to an acoustic front end (AFE). The AFE may transform the raw audio data 1143 (for example, a single-channel, 16-bit audio stream sampled at 16 kHz), captured by the microphone, into audio feature vectors that may ultimately be used for processing by various components, such as a wakeword detection module 1138, speech recognition engine, or other components. The AFE may reduce noise in the raw audio data 1143. The AFE may also perform acoustic echo cancellation (AEC) or other operations to account for output audio data that may be sent to a speaker of the autonomously motile device 110 for output. For example, the autonomously motile device 110 may be playing music or other audio that is being received from a network 199 in the form of output audio data. To prevent the output audio interfering with the device's ability to detect and process input audio, the AFE or other component may perform echo cancellation to remove the output audio data from the input raw audio data 1143, or other operations.

The AFE may divide the raw audio data 1143 into frames representing time intervals for which the AFE determines a number of values (i.e., features) representing qualities of the raw audio data 1143, along with a set of those values (i.e., a feature vector or audio feature vector) representing features/qualities of the raw audio data 1143 within each frame. A frame may be a certain period of time, for example a sliding window of 25 ms of audio data taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 1143, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors (or the raw audio data 1143) may be input into a wakeword detection module 1138 that is configured to detect keywords spoken in the audio. The wakeword detection module 1138 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the autonomously motile device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the autonomously motile device 110 (or separately from speech detection), the autonomously motile device 110 may use the wakeword detection module 1138 to perform wakeword detection to determine when a user intends to speak a command to the autonomously motile device 110. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 1138 may compare audio data to stored models or data to detect a wakeword. One approach for wakeword detection general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local autonomously motile device 110 may "wake" and begin transmitting audio data (which may include one or more of the raw audio data 1143 or the audio feature vectors) to one or more server(s) 1200 for speech processing. The audio data corresponding to audio obtained by the microphone may be processed locally on one or more of the processors 1104, sent to a server 1200 for routing to a recipient device or may be sent to the server 1200 for speech processing for interpretation of the included speech (either for purposes of enabling voice-communications and/or for purposes of executing a command in the speech). The audio data may include data corresponding to the wakeword, or the portion of the audio data corresponding to the wakeword may be removed by the autonomously motile device 110 before processing by the navigation map component 1135, prior to sending to the server 1200, and so forth.

The speech processing component 1137 may include or access an automated speech recognition (ASR) module. The ASR module may accept as input raw audio data 1143, audio feature vectors, or other sensor data 514e and so forth and may produce as output the input data comprising a text string or other data representation. The input data comprising the text string or other data representation may be processed by the navigation map component 1135 to determine the command to be executed. For example, the utterance of the command "robot, come here" may result in input data comprising the text string "come here". The wakeword "robot" may be omitted from the input data.

The autonomous navigation component 1136 provides the autonomously motile device 110 with the ability to navigate within the environment 302 without real-time human interaction. The autonomous navigation component 1136 may implement, or operate in conjunction with, the mapping component 1130 to determine the occupancy map data 1149, the navigation map data 1150, or other representation of the environment 302. In one implementation, the mapping component 1130 may use one or more simultaneous localization and mapping ("SLAM") techniques. The SLAM algorithms may utilize one or more of maps, algorithms, beacons, or other techniques to navigate. The autonomous navigation component 1136 may use the navigation map data 1150 to determine a set of possible paths along which the autonomously motile device 110 may move. One of these may be selected and used to determine path plan data 1152 indicative of a path. For example, a possible path that is the shortest or has the fewest turns may be selected and used to determine the path. The path is then subsequently used to determine a set of commands that drive the motors connected to the wheels. For example, the autonomous navigation component 1136 may determine the current location within the environment 302 and determine path plan data 1152 that describes the path to a destination location such as the docking station.

The autonomous navigation component 1136 may utilize various techniques during processing of sensor data 514e. For example, image data 514a obtained from cameras 212 on the autonomously motile device 110 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The autonomously motile device 110 may move responsive to a determination made by an onboard processor 1104, in response to a command received from one or more network interfaces 1119, as determined from the sensor data 514e, and so forth. For example, an external server 1200 may send a command that is received using the network interface 1119. This command may direct the autonomously motile device 110 to proceed to find a particular user, follow a particular user, and so forth. The autonomously motile device 110 may then process this command and use the autonomous navigation component 1136 to determine the directions and distances associated with carrying out the command. For example, the command to "come here" may result in a task component 1141 sending a command to the autonomous navigation component 1136 to move the autonomously motile device 110 to a particular location near the user and orient the autonomously motile device 110 in a particular direction.

The autonomously motile device 110 may connect to the network 199 using one or more of the network interfaces 1119. In some implementations, one or more of the modules or other functions described here may execute on the processors 1104 of the autonomously motile device 110, on the server 1200, or a combination thereof. For example, one or more servers 1200 may provide various functions, such as ASR, natural language understanding (NLU), providing content such as audio or video to the autonomously motile device 110, and so forth.

The other components may provide other functionality, such as object recognition, speech synthesis, user identification, and so forth. The other components may comprise a speech synthesis module that is able to convert text data to human speech. For example, the speech synthesis module may be used by the autonomously motile device 110 to provide speech that a user is able to understand.

The data store 1108 may store the other data as well. For example, localization settings may indicate local preferences such as language, user identifier data may be stored that allows for identification of a particular user, and so forth.

Figure 11D:
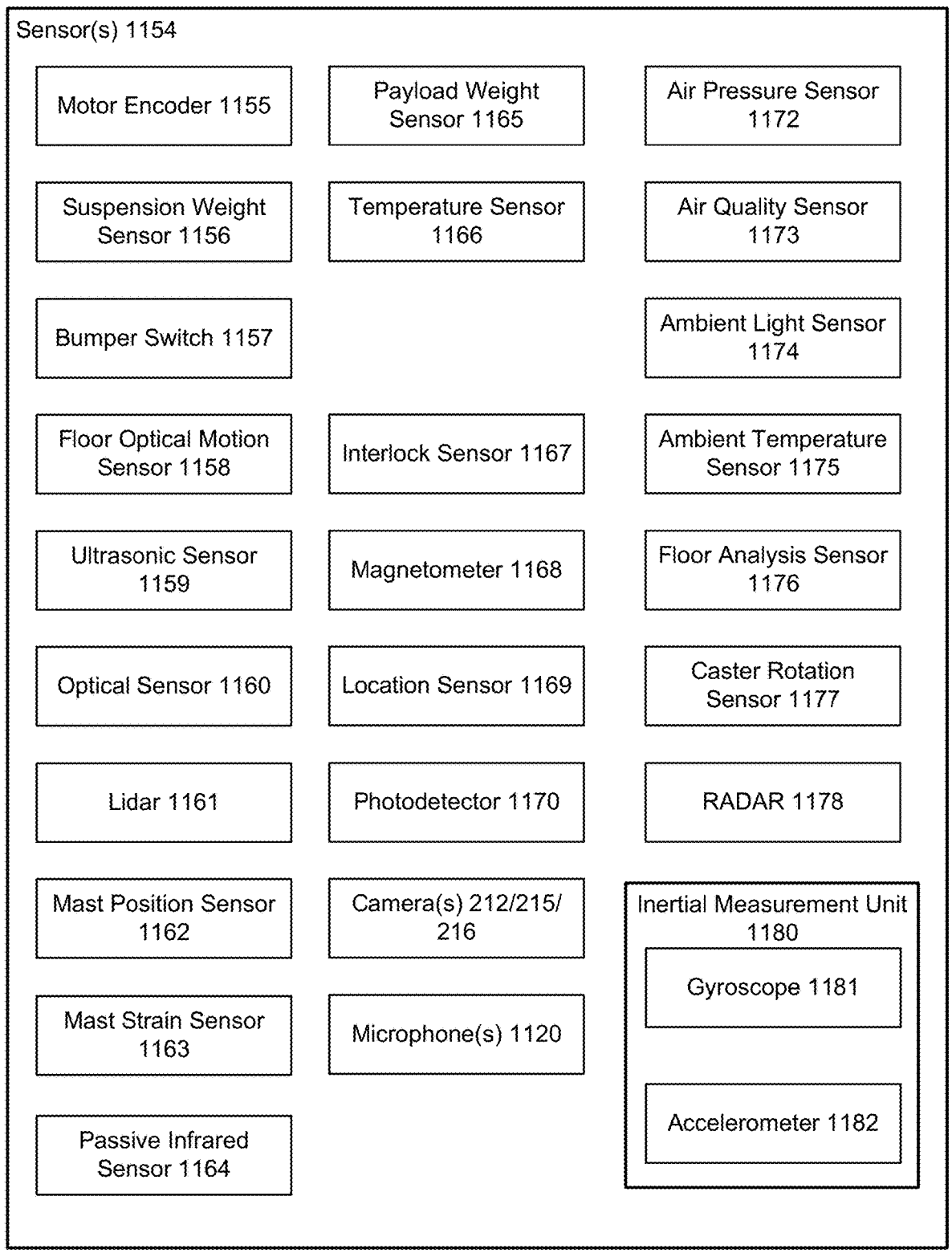
FIG. 11D illustrates sensors that may be included as part of an autonomously motile device according to embodiments of the present disclosure.

As shown in FIG. 11D, the autonomously motile device 110 may include one or more of the following sensors 1154. The sensors 1154 depicted here are provided by way of illustration and not necessarily as a limitation. It is understood that other sensors 1154 may be included or utilized by the autonomously motile device 110, while some sensors 1154 may be omitted in some configurations.

A motor encoder 1155 provides information indicative of the rotation or linear extension of a motor. The motor may comprise a rotary motor, or a linear actuator. In some implementations, the motor encoder 1155 may comprise a separate assembly such as a photodiode and encoder wheel that is affixed to the motor. In other implementations, the motor encoder 1155 may comprise circuitry configured to drive the motor. For example, the autonomous navigation component 1136 may utilize the data from the motor encoder 1155 to estimate a distance traveled.

A suspension weight sensor 1156 provides information indicative of the weight of the autonomously motile device 110 on the suspension system for one or more of the wheels or the caster. For example, the suspension weight sensor 1156 may comprise a switch, strain gauge, load cell, photodetector, or other sensing element that is used to determine whether weight is applied to a particular wheel, or whether weight has been removed from the wheel. In some implementations, the suspension weight sensor 1156 may provide binary data such as a "1" value indicating that there is a weight applied to the wheel, while a "0" value indicates that there is no weight applied to the wheel. In other implementations, the suspension weight sensor 1156 may provide an indication such as so many kilograms of force or newtons of force. The suspension weight sensor 1156 may be affixed to one or more of the wheels or the caster. In some situations, the safety component 1129 may use data from the suspension weight sensor 1156 to determine whether or not to inhibit operation of one or more of the motors. For example, if the suspension weight sensor 1156 indicates no weight on the suspension, the implication is that the autonomously motile device 110 is no longer resting on its wheels, and thus operation of the motors may be inhibited. In another example, if the suspension weight sensor 1156 indicates weight that exceeds a threshold value, the implication is that something heavy is resting on the autonomously motile device 110 and thus operation of the motors may be inhibited.

One or more bumper switches 1157 provide an indication of physical contact between a bumper or other member that is in mechanical contact with the bumper switch 1157. The safety component 1129 utilizes sensor data 514e obtained by the bumper switches 1157 to modify the operation of the autonomously motile device 110. For example, if the bumper switch 1157 associated with a front of the autonomously motile device 110 is triggered, the safety component 1129 may drive the autonomously motile device 110 backwards.

A floor optical motion sensor 1158 provides information indicative of motion of the autonomously motile device 110 relative to the floor or other surface underneath the autonomously motile device 110. In one implementation, the floor optical-motion sensors 1158 may comprise a light source such as light-emitting diode (LED), an array of photodiodes, and so forth. In some implementations, the floor optical-motion sensors 1158 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the floor optical-motion sensors 1158 may provide other information, such as data indicative of a pattern present on the floor, composition of the floor, color of the floor, and so forth. For example, the floor optical-motion sensors 1158 may utilize an optoelectronic sensor that may detect different colors or shades of gray, and this data may be used to generate floor characterization data. The floor characterization data may be used for navigation.

An ultrasonic sensor 1159 utilizes sounds in excess of 20 kHz to determine a distance from the sensor 1154 to an object. The ultrasonic sensor 1159 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 1159 may provide information indicative of a presence of an object, distance to the object, and so forth. Two or more ultrasonic sensors 1159 may be utilized in conjunction with one another to determine a location within a two-dimensional plane of the object.

In some implementations, the ultrasonic sensor 1159 or a portion thereof may be used to provide other functionality. For example, the emitter of the ultrasonic sensor 1159 may be used to transmit data and the detector may be used to receive data transmitted that is ultrasonic sound. In another example, the emitter of an ultrasonic sensor 1159 may be set to a particular frequency and used to generate a particular waveform such as a sawtooth pattern to provide a signal that is audible to an animal, such as a dog or a cat.

An optical sensor 1160 may provide sensor data 514e indicative of one or more of a presence or absence of an object, a distance to the object, or characteristics of the object. The optical sensor 1160 may use time-of-flight, structured light, interferometry, or other techniques to generate the distance data. For example, time-of-flight determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 1160 may utilize one or more sensing elements. For example, the optical sensor 1160 may comprise a 4×4 array of light sensing elements. Each individual sensing element may be associated with a field of view that is directed in a different way. For example, the optical sensor 1160 may have four light sensing elements, each associated with a different 100 field-of-view, allowing the sensor to have an overall field-of-view of 40°.

In another implementation, a structured light pattern may be provided by the optical emitter. A portion of the structured light pattern may then be detected on the object using a sensor 1154 such as an image sensor or camera 212. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 1160 may operate as a depth camera, providing a two-dimensional image of a scene, as well as data that indicates a distance to each pixel.

Data from the optical sensors 1160 may be utilized for collision avoidance. For example, the safety component 1129 and the autonomous navigation component 1136 may utilize the sensor data 514e indicative of the distance to an object in order to prevent a collision with that object.

Multiple optical sensors 1160 may be operated such that their field-of-view overlap at least partially. To minimize or eliminate interference, the optical sensors 1160 may selectively control one or more of the timing, modulation, or frequency of the light emitted. For example, a first optical sensor 1160 may emit light modulated at 30 kHz while a second optical sensor 1160 emits light modulated at 33 kHz.

A lidar 1161 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 514e may be generated that is indicative of the presence of objects and the relative positions, shapes, and so forth that are visible to the lidar 1161. Data from the lidar 1161 may be used by various modules. For example, the autonomous navigation component 1136 may utilize point cloud data generated by the lidar 1161 for localization of the autonomously motile device 110 within the environment 302.

The autonomously motile device 110 may include a mast. A mast position sensor 1162 provides information indicative of a position of the mast of the autonomously motile device 110. For example, the mast position sensor 1162 may comprise limit switches associated with the mast extension mechanism that indicate whether the mast is at an extended or retracted position. In other implementations, the mast position sensor 1162 may comprise an optical code on at least a portion of the mast that is then interrogated by an optical emitter and a photodetector to determine the distance to which the mast is extended. In another implementation, the mast position sensor 1162 may comprise an encoder wheel that is attached to a mast motor that is used to raise or lower the mast. The mast position sensor 1162 may provide data to the safety component 1129. For example, if the autonomously motile device 110 is preparing to move, data from the mast position sensor 1162 may be checked to determine if the mast is retracted, and if not, the mast may be retracted prior to beginning movement.

A mast strain sensor 1163 provides information indicative of a strain on the mast with respect to the remainder of the autonomously motile device 110. For example, the mast strain sensor 1163 may comprise a strain gauge or load cell that measures a side-load applied to the mast or a weight on the mast or downward pressure on the mast. The safety component 1129 may utilize sensor data 514e obtained by the mast strain sensor 1163. For example, if the strain applied to the mast exceeds a threshold amount, the safety component 1129 may direct an audible and visible alarm to be presented by the autonomously motile device 110.

The autonomously motile device 110 may include a modular payload bay. A payload weight sensor 1165 provides information indicative of the weight associated with the modular payload bay. The payload weight sensor 1165 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 1165 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 1165 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety component 1129 may utilize the payload weight sensor 1165 to determine if the modular payload bay has been overloaded. If so, an alert or notification may be issued.

One or more device temperature sensors 1166 may be utilized by the autonomously motile device 110. The device temperature sensors 1166 provide temperature data of one or more components within the autonomously motile device 110. For example, a device temperature sensor 1166 may indicate a temperature of one or more the batteries, one or more motors, and so forth. In the event the temperature exceeds a threshold value, the component associated with that device temperature sensor 1166 may be shut down.

One or more interlock sensors 1167 may provide data to the safety component 1129 or other circuitry that prevents the autonomously motile device 110 from operating in an unsafe condition. For example, the interlock sensors 1167 may comprise switches that indicate whether an access panel is open. The interlock sensors 1167 may be configured to inhibit operation of the autonomously motile device 110 until the interlock switch indicates a safe condition is present.

An inertial measurement unit (IMU) 1180 may include a plurality of gyroscopes 1181 and accelerometers 1182 arranged along different axes. The gyroscope 1181 may provide information indicative of rotation of an object affixed thereto. For example, a gyroscope 1181 may generate sensor data 514e that is indicative of a change in orientation of the autonomously motile device 110 or a portion thereof.

The accelerometer 1182 provides information indicative of a direction and magnitude of an imposed acceleration. Data such as rate of change, determination of changes in direction, speed, and so forth may be determined using the accelerometer 1182. The accelerometer 1182 may comprise mechanical, optical, micro-electromechanical, or other devices. For example, the gyroscope 1181 in the accelerometer 1182 may comprise a prepackaged solid-state unit.

A magnetometer 1168 may be used to determine an orientation by measuring ambient magnetic fields, such as the terrestrial magnetic field. For example, the magnetometer 1168 may comprise a Hall effect transistor that provides output compass data indicative of a magnetic heading.

The autonomously motile device 110 may include one or more location sensors 1169. The location sensors 1169 may comprise an optical, radio, or other navigational system such as a global positioning system (GPS) receiver. For indoor operation, the location sensors 1169 may comprise indoor position systems, such as using Wi-Fi Positioning Systems (WPS). The location sensors 1169 may provide information indicative of a relative location, such as "living room" or an absolute location such as particular coordinates indicative of latitude and longitude, or displacement with respect to a predefined origin.

A photodetector 1170 provides sensor data 514e indicative of impinging light. For example, the photodetector 1170 may provide data indicative of a color, intensity, duration, and so forth.

A camera 212 generates sensor data 514e indicative of one or more images. The camera 212 may be configured to detect light in one or more wavelengths including, but not limited to, terahertz, infrared, visible, ultraviolet, and so forth. For example, an infrared camera 212 may be sensitive to wavelengths between approximately 700 nanometers and 1 millimeter. The camera 212 may comprise charge coupled devices (CCD), complementary metal oxide semiconductor (CMOS) devices, microbolometers, and so forth. The autonomously motile device 110 may use image data acquired by the camera 212 for object recognition, navigation, collision avoidance, user communication, and so forth. For example, a pair of cameras 212 sensitive to infrared light may be mounted on the front of the autonomously motile device 110 to provide binocular stereo vision, with the sensor data 514e comprising images being sent to the autonomous navigation component 1136. In another example, the camera 212 may comprise a 10 megapixel or greater camera that is used for videoconferencing or for acquiring pictures for the user.

The camera 212 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 212, particularly those associated with navigation or autonomous operation, may utilize a global shutter. In other implementations, the camera(s) 212 providing images for use by the autonomous navigation component 1136 may be acquired using a rolling shutter and subsequently may be processed to mitigate image artifacts.

One or more microphones 1120 may be configured to acquire information indicative of sound present in the environment 302. In some implementations, arrays of microphones 1120 may be used. These arrays may implement beamforming techniques to provide for directionality of gain. The autonomously motile device 110 may use the one or more microphones 1120 to acquire information from acoustic tags, accept voice input from users, determine a direction of an utterance, determine ambient noise levels, for voice communication with another user or system, and so forth.

An air pressure sensor 1172 may provide information indicative of an ambient atmospheric pressure or changes in ambient atmospheric pressure. For example, the air pressure sensor 1172 may provide information indicative of changes in air pressure due to opening and closing of doors, weather events, and so forth.

An air quality sensor 1173 may provide information indicative of one or more attributes of the ambient atmosphere. For example, the air quality sensor 1173 may include one or more chemical sensing elements to detect the presence of carbon monoxide, carbon dioxide, ozone, and so forth. In another example, the air quality sensor 1173 may comprise one or more elements to detect particulate matter in the air, such as the photoelectric detector, ionization chamber, and so forth. In another example, the air quality sensor 1173 may include a hygrometer that provides information indicative of relative humidity.

An ambient light sensor 1174 may comprise one or more photodetectors or other light-sensitive elements that are used to determine one or more of the color, intensity, or duration of ambient lighting around the autonomously motile device 110.

An ambient temperature sensor 1175 provides information indicative of the temperature of the ambient environment 302 proximate to the autonomously motile device 110. In some implementations, an infrared temperature sensor may be utilized to determine the temperature of another object at a distance.

A floor analysis sensor 1176 may include one or more components that are used to generate at least a portion of floor characterization data. In one implementation, the floor analysis sensor 1176 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 1176 may be used by one or more of the safety component 1129, the autonomous navigation component 1136, the task component 1141, and so forth. For example, if the floor analysis sensor 1176 determines that the floor is wet, the safety component 1129 may decrease the speed of the autonomously motile device 110 and generate a notification alerting the user.

The floor analysis sensor 1176 may include other components as well. For example, a coefficient of friction sensor may comprise a probe that comes into contact with the surface and determines the coefficient of friction between the probe and the floor.

A caster rotation sensor 1177 provides data indicative of one or more of a direction of orientation, angular velocity, linear speed of the caster, and so forth. For example, the caster rotation sensor 1177 may comprise an optical encoder and corresponding target that is able to determine that the caster transitioned from an angle of 0° at a first time to 490 at a second time.

The sensors 1154 may include a radar 1178. The radar 1178 may be used to provide information as to a distance, lateral position, and so forth, to an object.

The sensors 1154 may include a passive infrared (PIR) sensor 1164. The PIR 1164 sensor may be used to detect the presence of users, pets, hotspots, and so forth. For example, the PIR sensor 1164 may be configured to detect infrared radiation with wavelengths between 8 and 14 micrometers.

The autonomously motile device 110 may include other sensors as well. For example, a capacitive proximity sensor may be used to provide proximity data to adjacent objects. Other sensors may include radio frequency identification (RFID) readers, near field communication (NFC) systems, coded aperture cameras, and so forth. For example, NFC tags may be placed at various points within the environment 302 to provide landmarks for the autonomous navigation component 1136. One or more touch sensors may be utilized to determine contact with a user or other objects.

The autonomously motile device 110 may include one or more output devices. A motor (not shown) may be used to provide linear or rotary motion. A light 258 may be used to emit photons. A speaker 1112 may be used to emit sound. A display 214 may comprise one or more of a liquid crystal display, light emitting diode display, electrophoretic display, cholesteric liquid crystal display, interferometric display, and so forth. The display 214 may be used to present visible information such as graphics, pictures, text, and so forth. In some implementations, the display 214 may comprise a touchscreen that combines a touch sensor and a display 214.

In some implementations, the autonomously motile device 110 may be equipped with a projector. The projector may be able to project an image on a surface, such as the floor, wall, ceiling, and so forth.

A scent dispenser may be used to emit one or more smells. For example, the scent dispenser may comprise a plurality of different scented liquids that may be evaporated or vaporized in a controlled fashion to release predetermined amounts of each.

One or more moveable component actuators may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators to produce movement of the moveable component.

In other implementations, other output devices may be utilized. For example, the autonomously motile device 110 may include a haptic output device that provides output that produces particular touch sensations to the user. Continuing the example, a motor with an eccentric weight may be used to create a buzz or vibration to allow the autonomously motile device 110 to simulate the purr of a cat.

As noted above, multiple devices may be employed in a single system. In such a multi-device system, each of the devices may include different components for performing different aspects of the system's processing. The multiple devices may include overlapping components. The components of the autonomously motile device 110 and/or the system(s) 1200 as described herein, are illustrative, and may be located as a stand-alone device or may be included, in whole or in part, as a component of a larger device or system.

Figure 13:
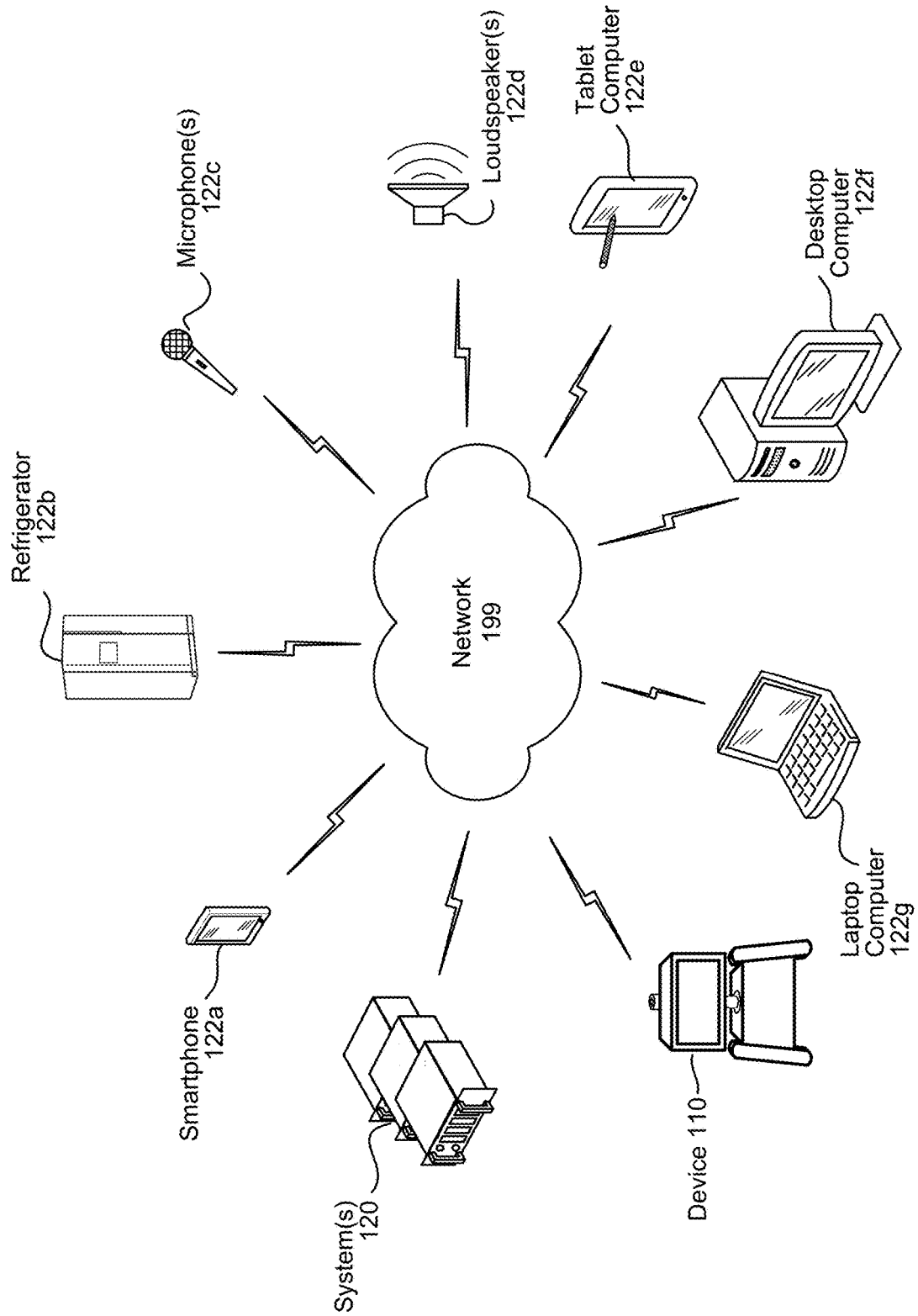
FIG. 13 illustrates a network that includes an autonomously motile device according to embodiments of the present disclosure.

As illustrated in FIG. 13 and as discussed herein, the autonomously motile device 110 may communicate, using the network 199, with the system 1200 and/or a user device. The network(s) 199 may include a local or private network or may include a wide network such as the Internet. The devices may be connected to the network(s) 199 through either wired or wireless connections. Example user devices include a cellular phone 122a, a refrigerator 122b, a microphone 122c, a loudspeaker 122d, a tablet computer 122e, a desktop computer 122f, and a laptop computer 122g, which may be connected to the network(s) 199 through a wireless service provider, over a Wi-Fi or cellular network connection, or the like. Other devices are included as network-connected support devices, such as the system(s) 1200, the skill system(s), and/or others.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end, which comprises, among other things, analog and/or digital filters (e.g., filters configured as firmware to a digital signal processor).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, at an autonomously motile device, a command instructing the autonomously motile device to follow a user;

determining that processing of the command to follow the user depends upon output from an object-detection component, an object-recognition component, and a position-estimation component;

determining first image data using at least a first camera of the autonomously motile device;

determining, using the first image data and the object-detection component, a face represented in a first portion of the first image data;

determining, using the first portion of the first image data and the object-recognition component, an identifier corresponding to the face;

determining that the identifier corresponds to the user;

determining, using the first portion of the first image data and the position-estimation component, a first position of the autonomously motile device with respect to the user; and causing the autonomously motile device to move to a second position with respect to the user, wherein the second position is closer to the user than the first position.

2. The computer-implemented method of claim 1, further comprising, prior to causing the autonomously motile device to move to the second position:

determining, using the first image data and the object-recognition component, a body represented in a second portion of the first image data;

associating the body with the identifier;

determining second image data using at least the first camera of the autonomously motile device;

determining, using the second image data and the object-detection component, that the face is not represented in the second image data;

determining, using the second image data and the object-detection component, that the body is represented in a first portion of the second image data;

determining, using the first portion of the second image data and the position-estimation component, a third position of the autonomously motile device with respect to the user; and determining that the third position is farther from the user than the first position, wherein causing the autonomously motile device to move to the second position is based at least in part on the third position being farther from the user than the first position.

3. A computer-implemented method comprising:

determining, at a device, command data corresponding to a property of a first object in an environment;

determining that the command data corresponds to a first computer vision component and a second computer vision component, the first computer vision component corresponding to a first type of computer vision, the second computer vision component corresponding to a second type of computer vision different from the first type of computer vision;

determining that an input to the second computer vision component corresponds to an output of the first computer vision component;

determining first image data including a first representation of the first object;

determining, using the first computer vision component and the first image data, first output data;

determining that the first output data corresponds to the first object and a second object;

processing, using the second computer vision component, a portion of the first output data corresponding to the first object to determine second output data representing the property; and based at least in part on the second output data, causing the device to perform an action.

4. The computer-implemented method of claim 3, further comprising:

determining, using a first camera of the device during a first time period, second image data including a second representation of the first object;

determining, using a second camera of the device during the first time period, third image data including a third representation of the first object;

determining, based on the second image data and the third image data, position data corresponding to a position of the first object in the environment; and determining, using a third computer vision component and the position data, third output data representing a position of the first object.

5. The computer-implemented method of claim 3, further comprising:

after determining the first output data, storing, in a storage associated with the device, computer vision data comprising the first image data, the first output data, and a time associated with the first image data; and prior to determining the second output data, determining that the storage includes the computer vision data.

6. The computer-implemented method of claim 3, further comprising:

determining that the first computer vision component corresponds to a first processing resource;

determining that the second computer vision component corresponds to a second processing resource;

determining that a third computer vision component corresponds to the first processing resource; and after determining the first output data and while determining at least a portion of the second output data, determining, using the third computer vision component and the first image data, third output data.

7. The computer-implemented method of claim 3, further comprising:

determining a time corresponding to the first image data;

receiving, from a sensor, sensor data representing a second property of the environment;

determining that the sensor data corresponds to the time; and determining third output data using a third computer vision component, the first image data, and the sensor data.

8. The computer-implemented method of claim 3, further comprising:

after determining the first image data, determining second image data including a second representation of the first object; and while determining at least a portion of the first output data, determining, using the first computer vision component and the second image data, third output data.

9. The computer-implemented method of claim 3, wherein the first output data corresponds to a first position of the first representation, and the computer-implemented method further comprises:

after determining the first image data, determining second image data including a second representation of the first object;

determining, using the first computer vision component and the second image data, third output data corresponding to a second position of the second representation;

determining a difference between the first position and the second position; and causing a camera of the device to move in accordance with the difference.

10. The computer-implemented method of claim 3, further comprising:

receiving, from a camera of the device, camera data having a first size;

determining, using an image resize component and the camera data, resized camera data having a second size different from the first size; and determining, using an image rectification component and the resized camera data, rectified camera data corresponding to a shape of a lens of the camera.

11. A device comprising:

at least one processor; and at least one memory including instructions that, when executed by the at least one processor, cause the device to:

determine, at the device, command data corresponding to a property of a first object in an environment;

determine that the command data corresponds to a first computer vision component and a second computer vision component, the first computer vision component corresponding to a first type of computer vision, the second computer vision component corresponding to a second type of computer vision different from the first type of computer vision;

determine that an input to the second computer vision component corresponds to an output of the first computer vision component;

determine first image data including a first representation of the first object;

determine, using the first computer vision component and the first image data, first output data;

determine that the first output data corresponds to the first object and a second object;

process, using the second computer vision component, a portion of the first output data corresponding to the first object to determine second output data representing the property; and based at least in part on the second output data, cause the device to perform an action.

12. The device of claim 11, wherein the at least one memory further comprises instructions that, when executed by the at least one processor, further cause the device to:

determine, using a first camera of the device during a first time period, second image data including a second representation of the first object;

determine, using a second camera of the device during the first time period, third image data including a third representation of the first object;

determine, based on the second image data and the third image data, position data corresponding to a position of the first object in the environment; and determine, using a third computer vision component and the position data, third output data representing the position of the first object.

13. The device of claim 11, wherein the at least one memory further comprises instructions that, when executed by the at least one processor, further cause the device to:

after determining the first output data, store, in a storage associated with the device, computer vision data comprising the first image data, the first output data, and a time associated with the first image data; and prior to determining the second output data, determining that the storage includes the computer vision data.

14. The device of claim 11, wherein the at least one memory further comprises instructions that, when executed by the at least one processor, further cause the device to:

determine that the first computer vision component corresponds to a first processing resource;

determine that the second computer vision component corresponds to a second processing resource;

determine that a third computer vision component corresponds to the first processing resource; and after determining the first output data and while determining at least a portion of the second output data, determine, using the third computer vision component and the first image data, third output data.

15. The device of claim 11, wherein the at least one memory further comprises instructions that, when executed by the at least one processor, further cause the device to:

determine a time corresponding to the first image data;

receive, from a sensor, sensor data representing a second property of the environment;

determine that the sensor data corresponds to the time; and determine third output data using a third computer vision component, the first image data, and the sensor data.

16. The device of claim 11, wherein the at least one memory further comprises instructions that, when executed by the at least one processor, further cause the device to:

after determining the first image data, determine second image data including a second representation of the first object; and while determining at least a portion of the first output data, determine, using the first computer vision component and the second image data, third output data.

17. The device of claim 11, wherein the first output data corresponds to a first position of the first representation, and wherein the at least one memory further comprises instructions that, when executed by the at least one processor, further cause the device to:

after determining the first image data, determine second image data including a second representation of the first object;

determine, using the first computer vision component and the second image data, third output data corresponding to a second position of the second representation;

determine a difference between the first position and the second position; and cause a camera of the device to move in accordance with the difference.

18. The device of claim 11, wherein the at least one memory further comprises instructions that, when executed by the at least one processor, further cause the device to:

receive, from a camera of the device, camera data having a first size;

determine, using an image resize component and the camera data, resized camera data having a second size different from the first size; and determine, using an image rectification component and the resized camera data, rectified camera data corresponding to a shape of a lens of the camera.

* * * * *